US009177546B2

(12) United States Patent
Sun et al.

(10) Patent No.: US 9,177,546 B2
(45) Date of Patent: Nov. 3, 2015

(54) CLOUD BASED ADAPTIVE LEARNING FOR DISTRIBUTED SENSORS

(71) Applicant: Texas Instruments Incorporated, Dallas, TX (US)

(72) Inventors: Lin Sun, San Jose, CA (US); Wei Ma, San Ramon, CA (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 246 days.

(21) Appl. No.: 14/013,009

(22) Filed: Aug. 28, 2013

(65) Prior Publication Data
US 2015/0066497 A1 Mar. 5, 2015

(51) Int. Cl.
*G10L 15/065* (2013.01)

(52) U.S. Cl.
CPC .................................... *G10L 15/065* (2013.01)

(58) Field of Classification Search
CPC ..................................................... G10L 15/065
USPC .......................................................... 704/233
See application file for complete search history.

(56) References Cited

U.S. PATENT DOCUMENTS

| 5,983,179 | A | * | 11/1999 | Gould | 704/270.1 |
| 7,460,024 | B1 | | 12/2008 | Ma et al. | |
| 8,417,522 | B2 | * | 4/2013 | Xu et al. | 704/233 |
| 8,595,806 | B1 | * | 11/2013 | Gabrielson | 726/7 |
| 8,620,655 | B2 | * | 12/2013 | Xu et al. | 704/236 |
| 8,831,947 | B2 | * | 9/2014 | Wasserblat et al. | 704/255 |
| 8,963,916 | B2 | * | 2/2015 | Reitan | 345/419 |

OTHER PUBLICATIONS

Bernhard E. Boser and Bruce A. Wooley, "The Design of Sigma-Delta Modulation Analog-to-Digital Converters", IEEE Journal of Solid-State Circuits, vol. 23, No. 6, Dec. 1988, pp. 1298-1308.

* cited by examiner

*Primary Examiner* — Susan McFadden
(74) *Attorney, Agent, or Firm* — John R. Pessetto; Frank D. Cimino

(57) ABSTRACT

A low power sound recognition sensor is configured to receive an analog signal that may contain a signature sound. Sound parameter information is extracted from the analog signal and compared to a sound parameter reference stored locally with the sound recognition sensor to detect when the signature sound is received in the analog signal. A trigger signal is generated when a signature sound is detected. A portion of the extracted sound parameter information is sent to a remote training location for adaptive training when a signature sound detection error occurs. An updated sound parameter reference from the remote training location is received in response to the adaptive training.

16 Claims, 20 Drawing Sheets

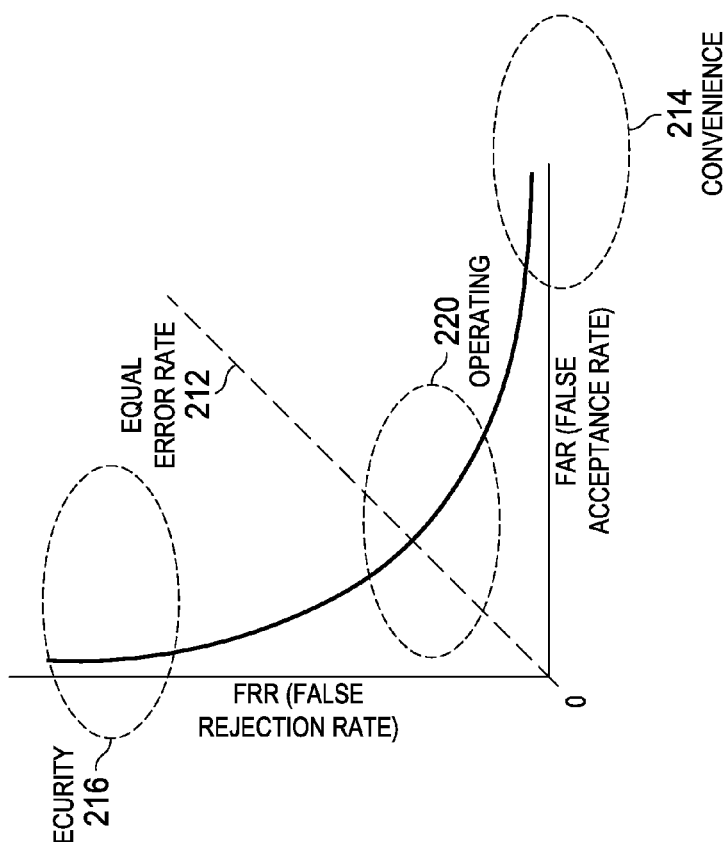
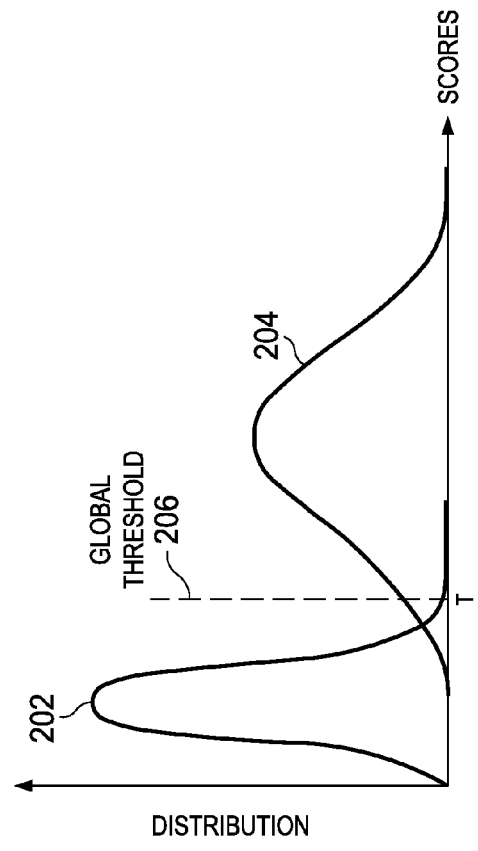
FIG. 2B
FIG. 2A

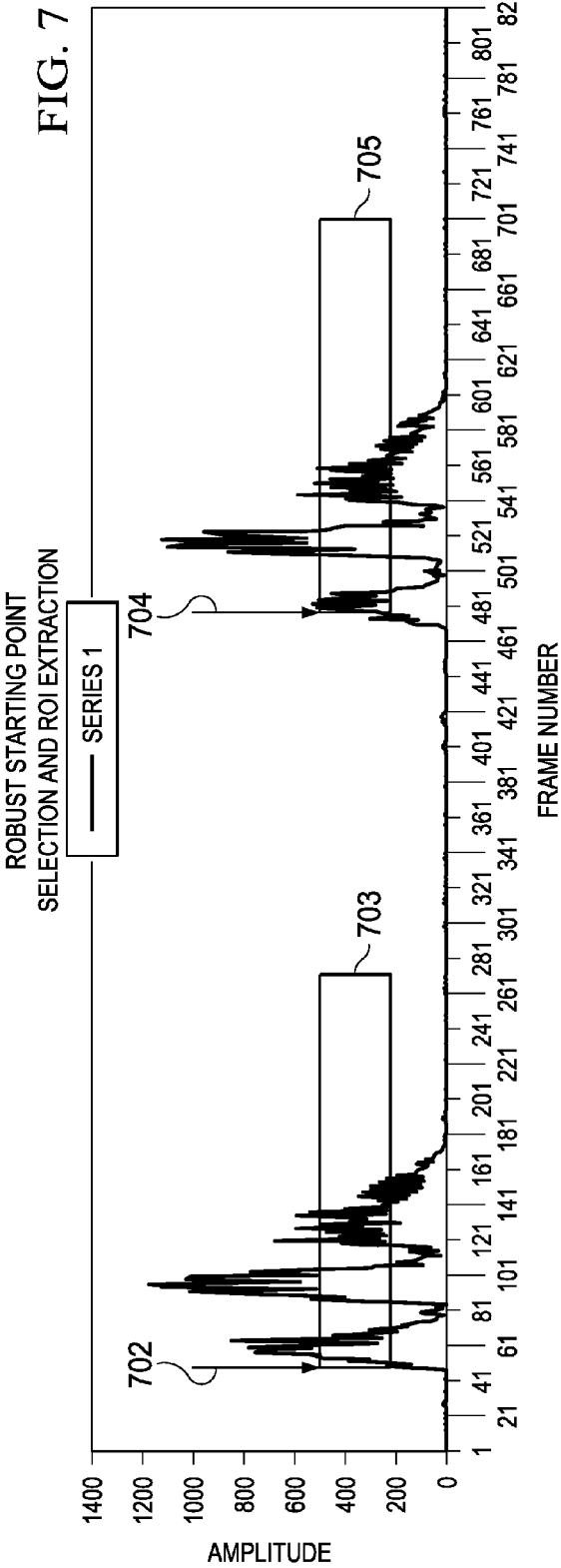
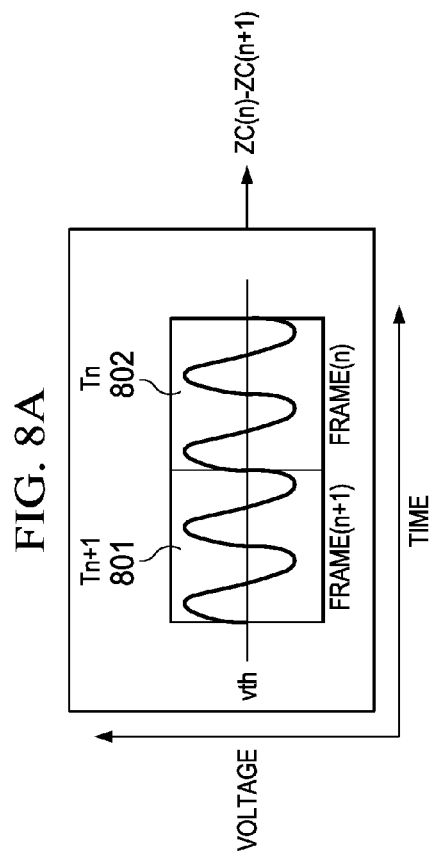

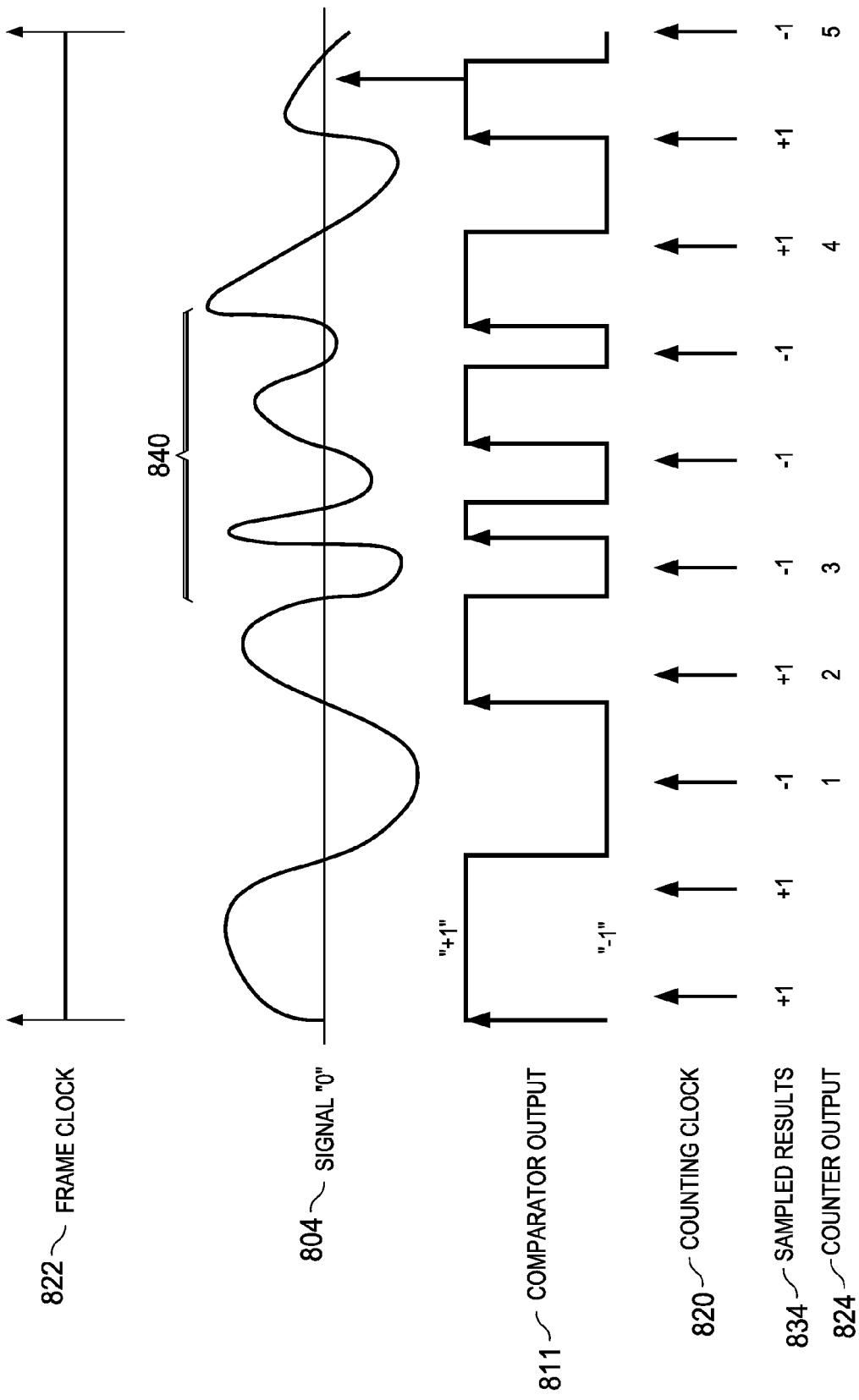

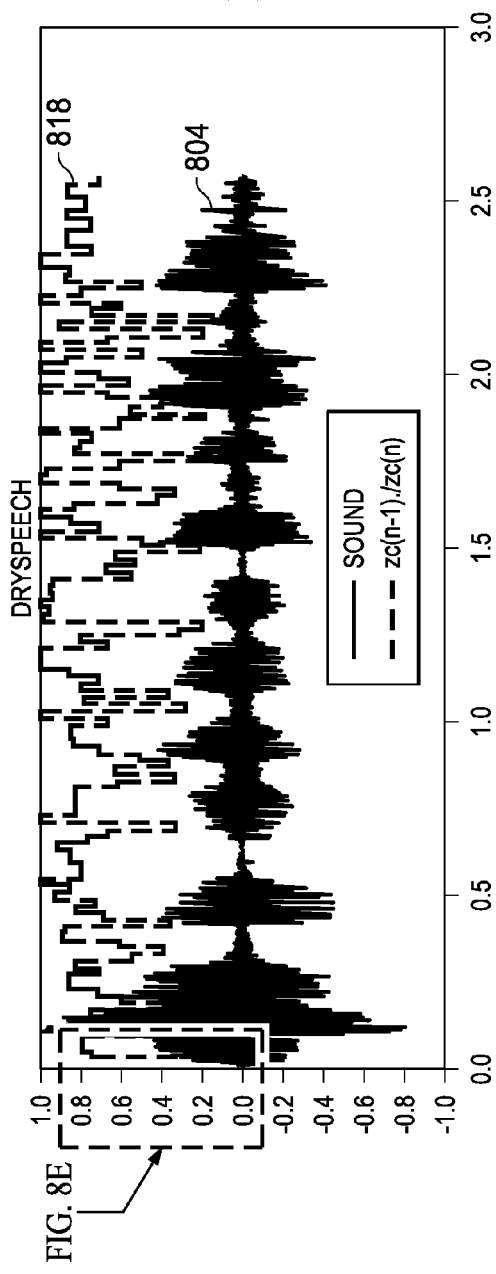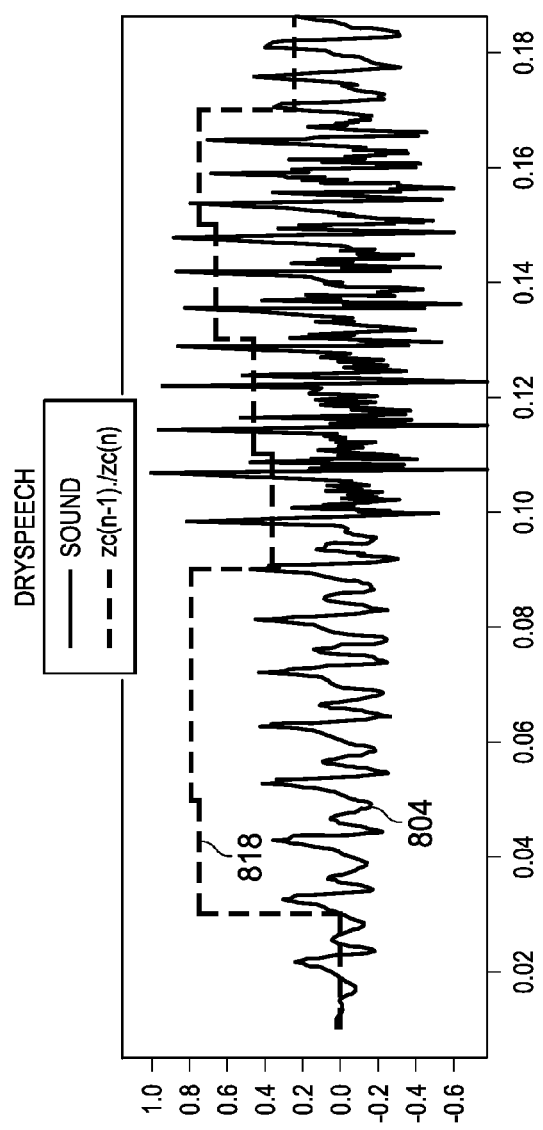

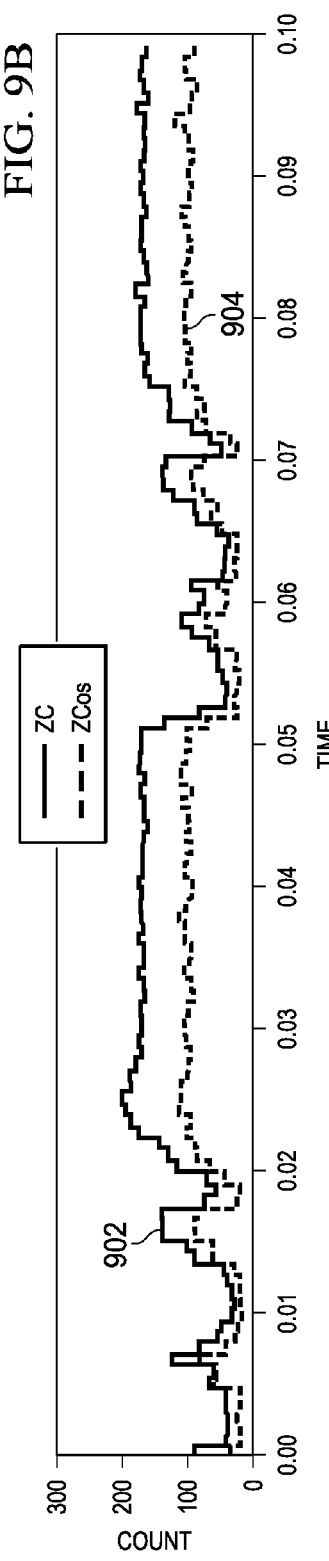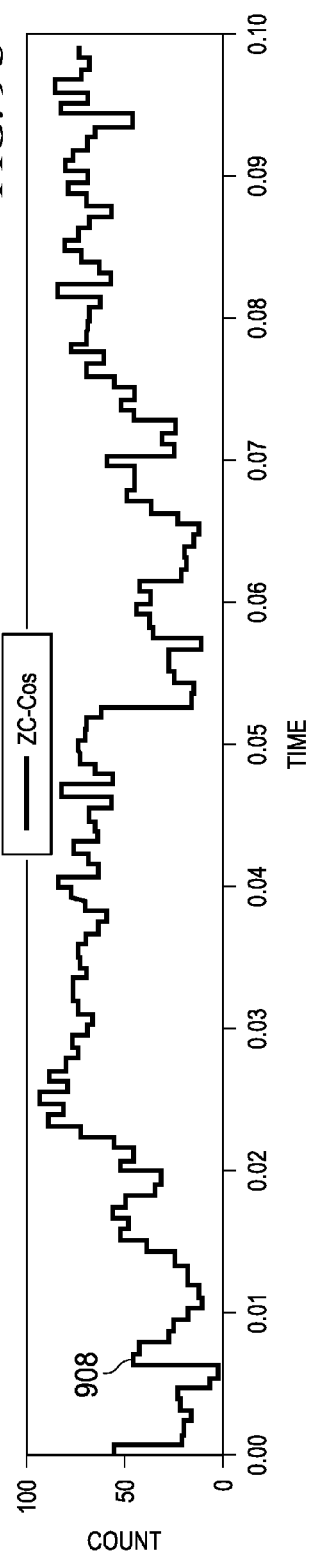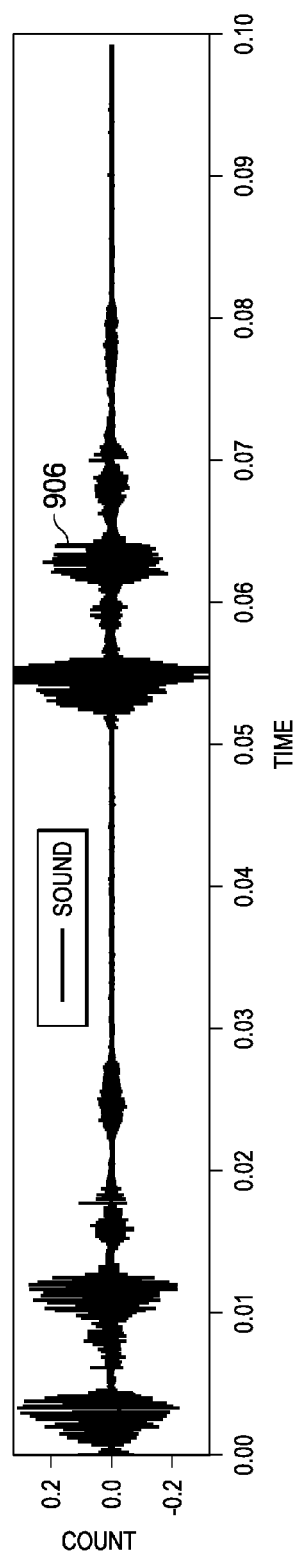

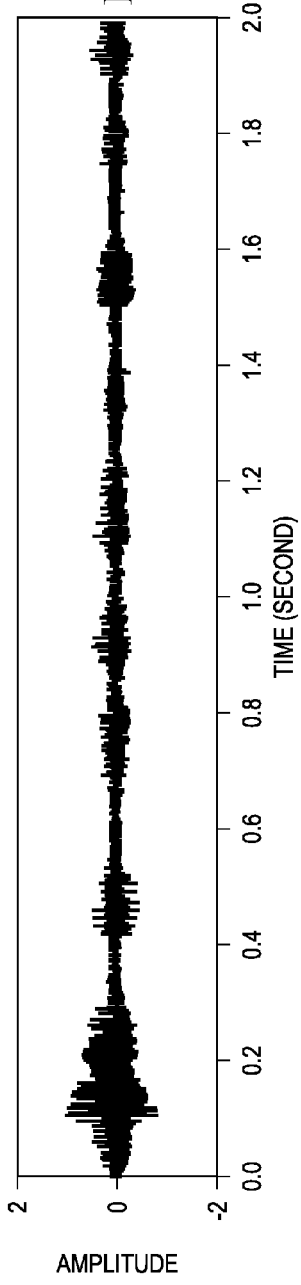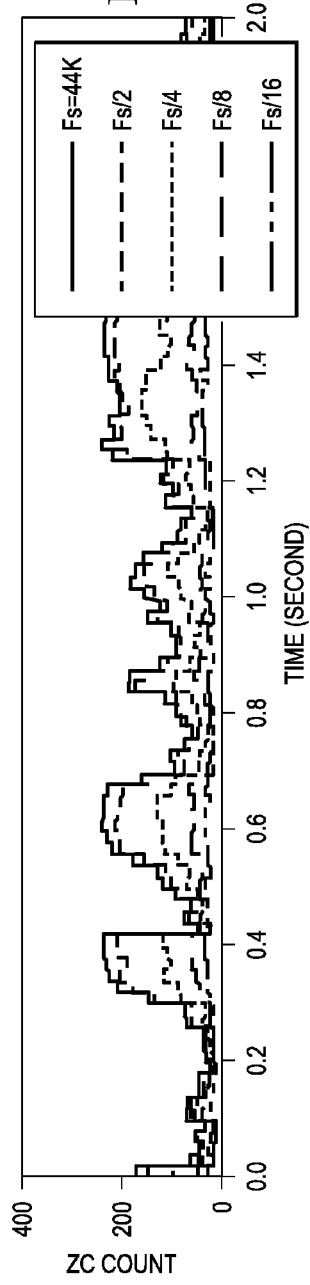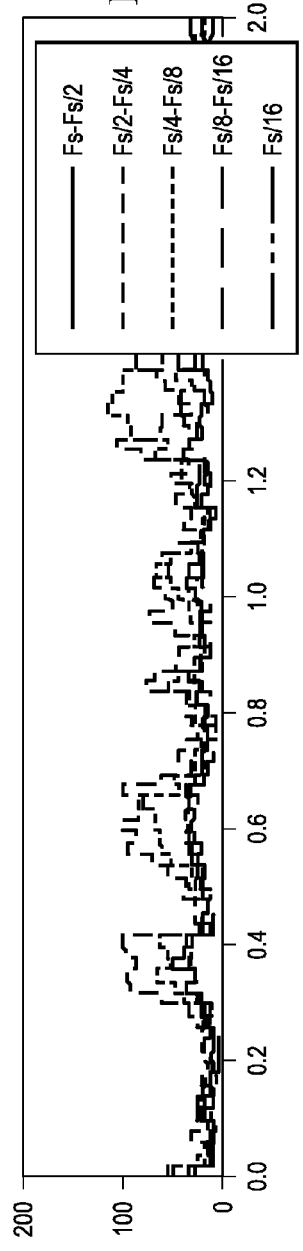

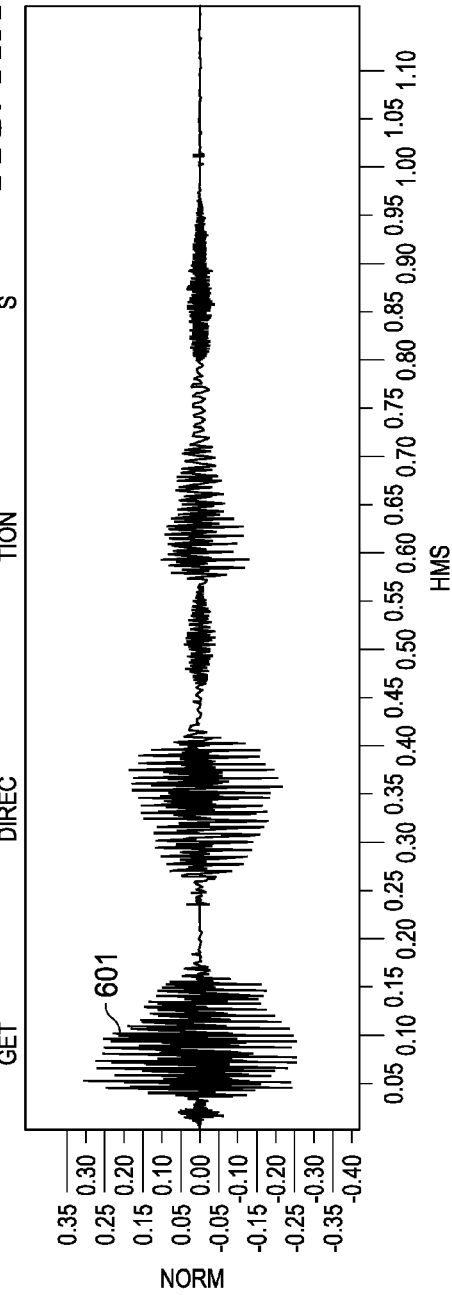
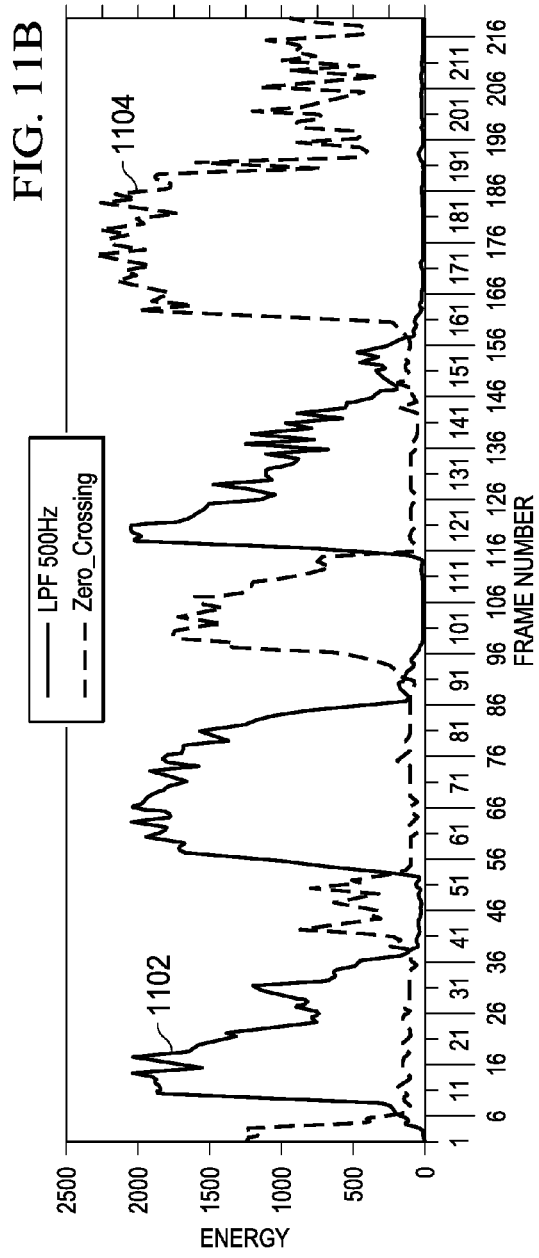

CLOUD BASED ADAPTIVE LEARNING FOR DISTRIBUTED SENSORS

FIELD OF THE INVENTION

The present invention relates to active sensor circuits, and in particular, to active sensor circuits that operate on low power and at a low duty cycle.

BACKGROUND OF THE INVENTION

With recent advancements in semiconductor manufacturing and sensor technologies, low power sensor networks, particularly those operating wirelessly, are providing new capabilities for monitoring various environments and controlling various processes associated with or within such environments. Applications, both civil and military, include transportation, manufacturing, biomedical, environmental management, and safety and security systems. Further, voice or sound controlled applications may be coupled with mobile telephony or other personal electronic devices and systems, automotive control and entertainment system, etc.

Particularly for wireless sensor networks, low power operation is critical to allow for maximum flexibility and battery life and minimum form factor. It has been found that typical wireless sensor assemblies use upwards of 90% of their power merely on environmental or channel monitoring while waiting for an anticipated event(s) to occur. In other words, simply monitoring for the occurrence of an anticipated event requires the expenditure of nearly all available power. This is particularly true for acoustic sensors, which often require significant amounts of power to perform voice or sound recognition.

This problem has been addressed thus far by having a low power, or "sleep," mode of operation in which the back end of the sensor assembly, e.g., the signal transmitter, or "radio," circuitry, is effectively shut down pending receipt of a signal indicating the occurrence of the anticipated event, such as a change in the local environmental conditions, such as acoustic noise or temperature, for example. This can reduce power consumption of the sensor assembly to levels in the range of 10 to 50 percent of normal or full power operation. However, for a low duty cycle system where each sensor assembly may only spend a very small amount of time (e.g., 1%) performing data transmission, the power being consumed during such an idle period can still constitute a major portion of the overall power budget.

BRIEF DESCRIPTION OF THE DRAWINGS

Particular embodiments in accordance with the invention will now be described, by way of example only, and with reference to the accompanying drawings:

FIGS. 2A and 2B are plots illustrating performance evaluation metrics for a sound recognition system;

FIG. 7 is a plot illustrating a region of interest that may be initiated by a trigger signal;

FIGS. 8A-8E, 9A-9D, and 10A-10C illustrate examples of robust A2I sound feature extraction;

FIGS. 11A-11B and 12A-12B illustrate two approaches for using A2I sparse sound features to recognize a spoken word or phrase;

Figure 1:
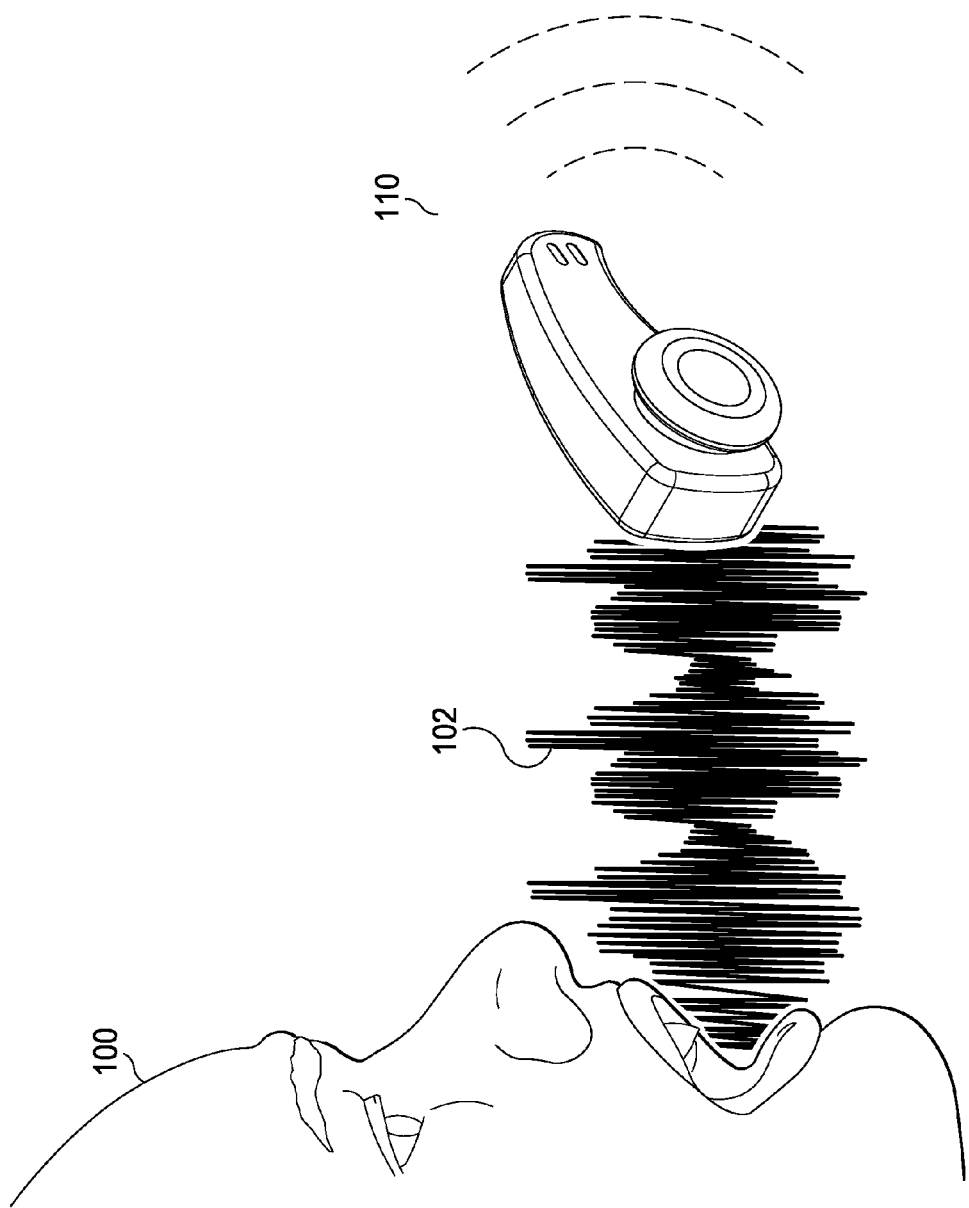
FIG. 1 is an illustration of a device in which detection of a unique sound may be used to cause the system to perform a task or operation.

Other features of the present embodiments will be apparent from the accompanying drawings and from the detailed description that follows.

DETAILED DESCRIPTION OF EMBODIMENTS OF THE INVENTION

Specific embodiments of the invention will now be described in detail with reference to the accompanying figures. Like elements in the various figures are denoted by like reference numerals for consistency. In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

As will be described in more detail below, a low power sound recognition sensor may be configured to receive an analog signal that may contain a signature sound. Sound parameter information may be extracted from the analog signal and compared to a sound parameter reference stored locally with the sound recognition sensor to detect when the signature sound is received in the analog signal. A trigger signal may be generated when a signature sound is detected. A portion of the extracted sound parameter information may be sent to a remote training location for adaptive training when a signature sound detection error occurs. An updated sound parameter reference from the remote training location may be received in response to the adaptive training Voice command recognition has become a very important approach for hand-free operations on devices, such as: mobile phone, remote control, security system, automobile, etc. The objective of voice command recognition is to discriminate between utterances in which a given keyword is uttered to utterances in which the keyword is not uttered. Sound or command recognition may be used for various applications, such as:

- to wake up devices by sound (mobile phone, pad, PC);
- to classify background sound conditions to assist device operations, such as office, restaurant, driving, on trains;
- context awareness sensing to detect special sounds to trigger alarms or surveillance camera such as gunshot, glass break, talking, walking, car approaching;
- to detect abnormal operation conditions by sounds such as motor, engine, electric arc, car crashing, glass break sound, animal chewing power cables, rain, wind, etc.

Current DSP based sound signature detection solutions typically digitally sample the raw data of the input signal at a Nyquist rate for frequencies of interest. All the complex signal segmentation, signal transformation and final pattern recognition are realized in the digital domain using the Nyquist rate digital samples. It requires both high-performance, high-accuracy analog-front-end (AFE) and analog to digital converter (ADC) to convert the analog signal to a digital one for the following complex digital processing. For example, for sound signal with 8K bandwidth, an ADC with 16-bit accuracy and at least 16 KSps is required. Since it records the raw data of the input signal, the input signal potentially could be reconstructed based on raw data, which increases the threat to the personal privacy. Problems for current DSP solutions are as followings:

high hardware/algorithm complexity;
high accuracy and high bandwidth on the analog front-end and ADC;
high power consumption when it is running continuously;
potential threat to personal privacy by reconstructing the sampled raw data.

Voice command recognition has progressed in paralleled with the development of automatic speech recognition. Most digital based solution using a high-speed and high resolution ADC extract the features in the frequency domain like Mel-frequency cepstrum coefficients (MFCC), Linear Predictive Coding (LPC), etc. Statistical Hidden Markov Models (HMM) are then used to model the phonemes or words. Disadvantages of this solution include high computation complexity and power consumption.

FIG. 1 is an illustration of a device in which detection of a unique sound may be used to cause the system to perform a task or operation. In this example, a person 100 may be interacting with a mobile phone 120. System user 100 may be holding the cell phone and talking directly to it, or user 100 may be wearing an earpiece 110 that contains a microphone and detection circuitry and is in contact with mobile phone 120 via a Bluetooth wireless channel, for example. In either case, earphone 110 and/or phone 120 may often be placed in a low power state in order to conserve battery power. Occasionally, user 100 may wish to place a call or otherwise interact with phone 120 and may speak a known word or phrase, such as "hello", or "call", or any other word or phrase that device 110 or 120 has been configured to expect. Sound energy in the form of a sound wave 102 may be received by a microphone within earpiece 110 or phone 120 and converted to an analog electrical signal. However, in order for earpiece 110 or phone 120 to respond to a known voice command from user 100, some portion of detection logic must be powered on to determine when an expected voice command is received. Since user 100 may speak a large number of words and phrases that have nothing to do with earpiece 110 and/or phone 120, the detection logic must be able to recognize when an expected command is received without wasting a lot of battery power on non-expected words and phrases.

Embodiments of the invention, as described in more detail herein, may perform a process that extracts sparse sound information directly from an analog signal that may be processed using ultra low power analog or mixed signal circuitry. This process is referred to herein as "analog to information" (A2I).

Embodiments of the invention are not limited to mobile phones or ear pieces. Other embodiments may include various computer tablets and pads, personal computers, and other forms of personal digital assistants now known or later developed that may be controlled using spoken words or phrases. Other embodiments may be included in control, access, and/ or entertainment systems for automobiles, homes, offices, etc.

Other embodiments may be included in sensors, such as wireless sensors, that may be monitoring a physical or environmental condition. For example, a water meter that may respond to the sound or vibration of running water, or a rain sensor that may respond to the sound or vibration caused by falling rain, etc.

FIGS. 2A and 2B are plots illustrating performance evaluation metrics for a sound recognition system. Various terms illustrated in these figures will be used during the descriptions that follow. For any sound recognition system, there will be occasions when the recognizer incorrectly rejects a genuine command or incorrectly accepts an imposter based on a recognition score. FIG. 2A is a plot illustrating a typical distribution of recognition scores for imposter commands 202 and recognition scores for genuine commands 204. A threshold 206 may be selected to define when a score will be interpreted as a genuine command or an imposter command.

FIG. 2B illustrates an operating curve 210 for an example sound recognizer system. A false rejection rate (FRR) is the frequency at which a system will inaccurately reject an genuine command. A false acceptance rate (FAR) is the frequency at which a system will inaccurately accept an imposter. The equal error rate (EER) is the rate at which FAR and FRR are equal, which is indicated by line 212. (1-FRR) is a measure of convenience, as indicated at 214. (1-FAR) is a measure of security, as indicated at 216. It is desirable to maximize both measures. Typically, the system detection threshold 206 may be selected so that an operating region 220 of the sound recognizer is located along EER line 212.

A user or system designer may select the operating point (threshold) in real applications based on their security or convenience requirements. For example, if the user or system designer sets the threshold too high, there are may not be any false alarms, but some genuine users will be rejected also. Likewise, if the threshold is set too low, maybe all the genuine users will be accepted, but the false alarm rates may be too high.

Figure 3:
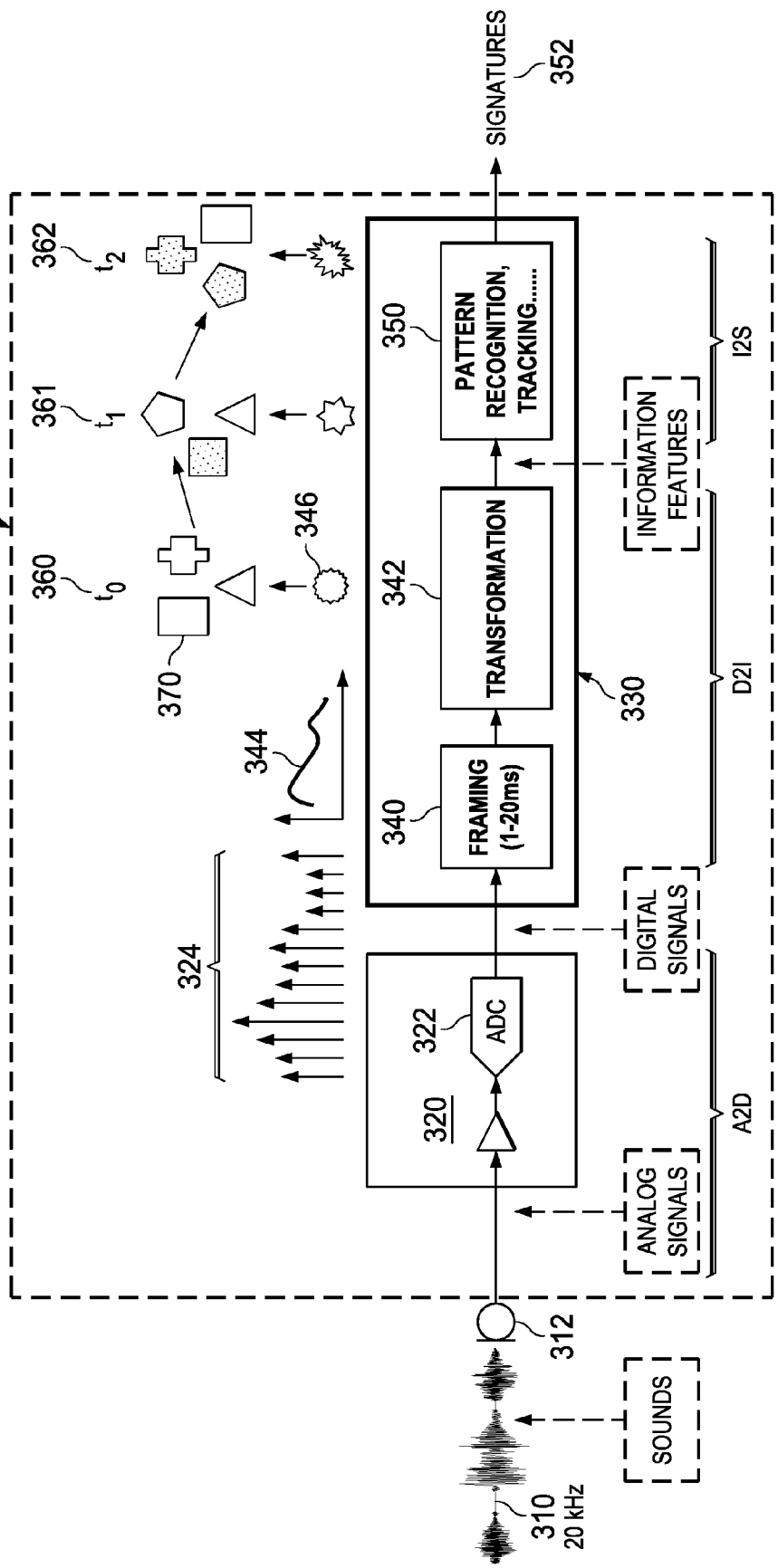
FIG. 3 is a functional diagram illustrating a typical prior art sound recognition system.

FIG. 3 is a functional diagram illustrating a typical prior art sound recognition system 300. Sounds 310 arrive at recognition system 300 via the surrounding environment, which is typically through air. For typical human speech recognition systems, sound signals in the frequency range of a few cycles up to perhaps 20 kHz are of interest. A microphone 312, or other type of transducer, converts the sound signals to an analog signal. In an analog front end (AFE) stage 320, the analog signal is converted to a digital signal (A2D) by an analog to digital converter (ADC) 322 that produces a sequence of digital samples 324. Typically, the sampling rate the Nyquist rate, which is twice the maximum frequency of interest; therefore, for a system that operates on received signals of up to 20 kHz, the sample rate may be 40 kHz.

Digital logic 330 includes a portion 332 that converts digital samples 324 to sound information (D2I) by partitioning the samples into frames 340 and then transforming 342 the framed samples into information features using a defined transform function 344.

A next portion 333 then maps the information features to sound signatures (I2S) using pattern recognition and tracking logic 350. Pattern recognition logic 350 typically operates in a periodic manner as represented by time points t(0) 360, t(1) 361, t(2) 362, etc. For example, as each information feature, as indicated by 346 for example, is produced, it is compared to a database 370 that includes multiple features as indicated generally at 370. At each time step, recognition logic 350 attempts to find match between a sequence of information features produced by transformation logic 342 and a sequence of sound signatures stored in data base 370. A degree of match for one or more candidate signatures 352 is indicated by a score value. When the score for a particular signature exceeds a threshold value, recognizer 300 may then indicate a match for the selected signature.

Recognition logic 350 may implement one or more types of known pattern recognition techniques, such as a Neural Network, a Classification Tree, Hidden Markov models, Conditional Random Fields, Support Vector Machine, etc. These techniques are all well known and will not be described in further detail herein.

Digital domain logic 330 may perform signal processing using various types of general purpose microcontroller units (MCU), a specialty digital signal processor (DSP), an application specific integrated circuit (ASIC), etc.

For battery powered system, a significant problem with recognition system 300 is that all the complex signal segmentation, signal transformation and final pattern recognition operations are performed in the digital domain. It requires both a high-performance, high-accuracy analog-front-end (AFE) and ADC to convert the analog signal to a digital signal for the following complex digital processing. For example, for a sound signal with an 8 kHz bandwidth, an ADC with 16-bit accuracy operating at least 16 KSps (samples per second) is required. Since the recognizer records the raw data of input signal 310, the input signal potentially could be reconstructed based on stored raw data, which poses a threat to the personal privacy of a user.

To mitigate the problem of high power consumption, system 300 may be configured to duty-cycle operation modes between normal detection on and standby. For example, from time to time the whole system may be turned on and run in full-power mode for detection. The rest of time it may be in low-power standby mode. However, duty cycled operation increases the possibility of missing an event.

Figure 4:
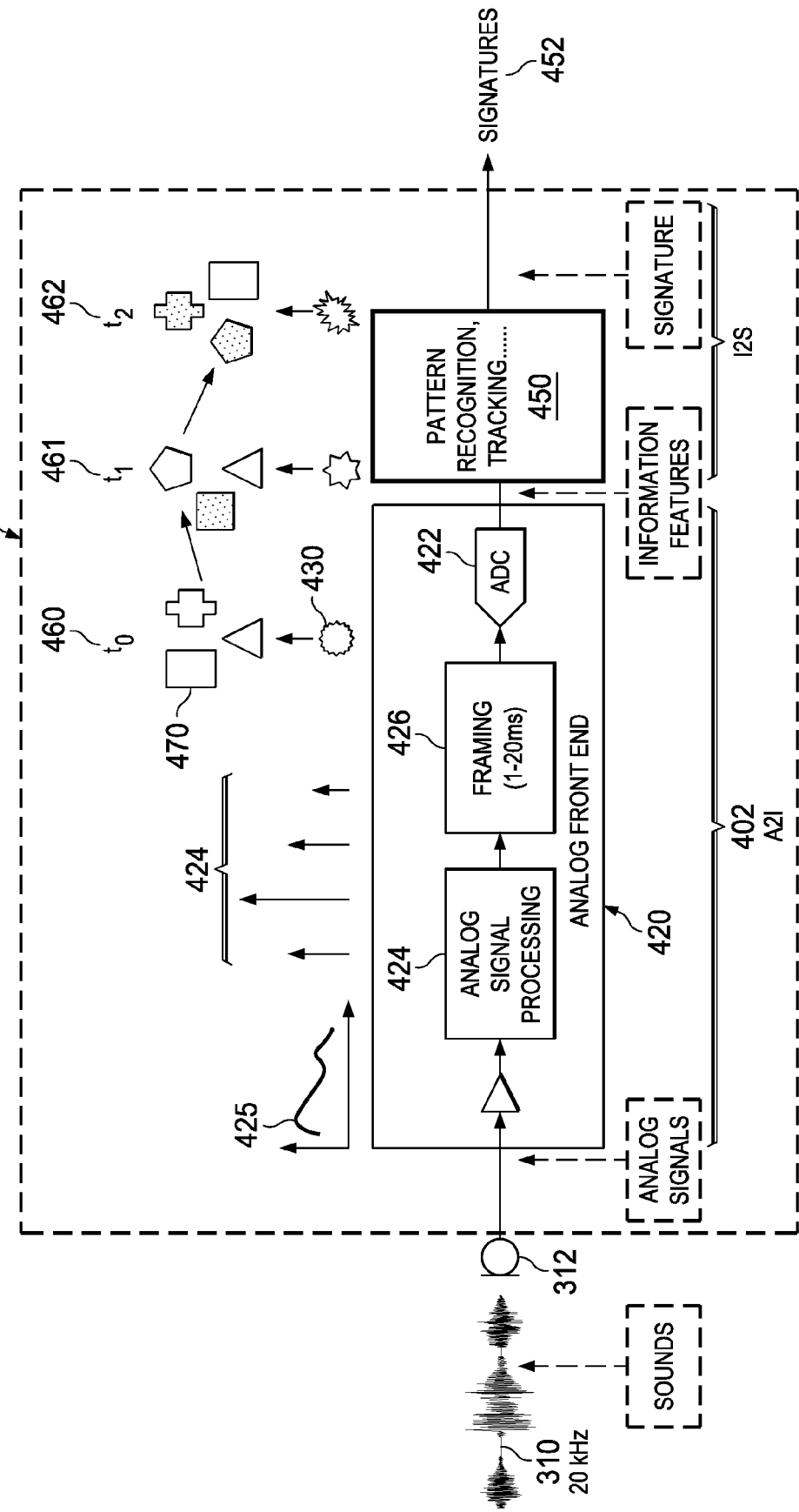
FIG. 4 is a functional diagram illustrating analog-to-information (A2I) operation of a sound recognition system that operates on sparse information extracted directly from an analog input signal.

FIG. 4 is a functional diagram illustrating analog-to-information (A2I) operation of a sound recognition system 400 that operates on sparse information 424 extracted directly from an analog input signal. Recognition system 400 sparsely extracts the frame-based features of the input sounds in the analog domain. Instead of digitizing all the raw data, recognizer 400 only digitizes the extracted features. In another words, recognizer 400 only digitizes information features. Pattern recognition based on these features is performed in the digital domain. Since the input sound is processed and framed in the analog domain, the framing removes most of the noise and interference that may be present on a sound signal. This in turn reduces the precision needed within on AFE. An ADC samples the frame-based features, therefore, the speed and performance requirement on the ADC are greatly reduced. For frames as large as 20 ms, the sound features may be digitized at a rate as slow as 50 Hz, much lower than the input signal Nyquist rate (typically 40 KHz for 20 KHz sound bandwidth). With such a moderate requirement on the performance of the AFE and ADC, extreme low power operation may be accomplished for the AFE and ADC design.

Due to its ultralow power consumption, system 400 to be operated in a continuous manner so that the possibility of missing a targeted event is reduced. Also, since system 400 only sparsely extracts sound features, these features are not sufficient to be used to reconstruct the original input sound, thereby assuring privacy to a user of the system.

Referring still to FIG. 4, a same analog signal 310 may be received by microphone 312 and converted to an analog signal. Analog signal processing logic 424 within analog front end 420 may perform various forms of analog signal processing. For example, one or more instances of low pass, high pass, band pass, band block, etc filters may be included to produce one or more filtered output channels, as illustrated at 425. The processed analog channel signals may then be framed by analog frame logic 426. The length of each frame may be selected for a given application; typical frame values may be in the range of 1-20 ms, for example.

After framing, a resultant value for each channel may then be digitized by ADC 422 to produce a sparse set of digital feature information as indicated generally at 424. Due to the low digitalization rate that is used, a low cost, low power sigma-delta analog to digital converter may be used. The general operation of ΣΔ ADCs is well known, e.g. see: "The Design of Sigma-Delta Modulation Analog-to-Digital Converters," Bernard Boser and Bruce Wooley, 1988, which is incorporated by reference herein. The general operation of an ΣΔ ADC will now be described to aid in understanding the operation of embodiments of the invention. While the use of a ΣΔ ADC is described herein, other implementations may use other types of known or later developed ADCs.

The rudimentary delta sigma converter is a 1-bit sampling system. An analog signal applied to the input of the converter needs to be relatively slow so the converter can sample it multiple times, a technique known as oversampling. The sampling rate is typically hundreds of times faster than the digital results at the output ports. Each individual sample is accumulated over time and "averaged" with the other input-signal samples through a digital/decimation filter.

The ΣΔ converter's primary internal cells are the ΣΔ modulator and the digital filter and decimator. While Nyquist A/D converters have one sample rate, the ΣΔ converter has two—the input sampling rate (fS) and the output data rate (fD). The ratio of these two rates is the decimation ratio and defines the oversampling rate. A ΣΔ modulator coarsely samples the input signal at a very high fS rate into a 1-bit stream. The digital/decimation filter then takes this sampled data and converts it into a high-resolution, slower fD rate digital code.

These digital features from ΣΔ ADC 422 may then be provided to pattern recognition logic 450 in the digital domain. Recognition logic 450 then maps the information features to sound signatures (I2S) using pattern recognition and tracking logic. Pattern recognition logic 450 typically operates in a periodic manner as represented by time points t(0) 460, t(1) 461, t(2) 462, etc. For example, as each information feature, as indicated by 430 for example, is produced, it is compared to a database 470 that includes multiple features as indicated generally at 470. At each time step, recognition logic 450 attempts to find match between a sequence of information features produced by ADC 422 and a sequence of sound signatures stored in data base 470. A degree of match for one or more candidate signatures 452 is indicated by a score value. When the score for a particular signature exceeds a threshold value, recognizer 400 may then indicate a match for the selected signature.

Recognition logic 450 may implement one or more type of known pattern recognition techniques, such as a Neural Network, a Classification Tree, Hidden Markov models, Conditional Random Fields, Support Vector Machine, etc. These techniques are all well known and will not be described in further detail herein.

Digital domain logic 450 may perform signal processing using various types of general purpose microcontroller units (MCU), a specialty digital signal processor (DSP), an application specific integrated circuit (ASIC), etc.

In this manner, recognition system 400 may operate continuously, but only use a small amount of power. It may continually monitor for one or more expected types of sounds, such as gun-shot sound, glass break sound, voice commands, speech phrase, a music melody, ultrasound emission for electric discharge such as an electrical arc in a piece of equipment, etc.

As will now be described in more detail, various implementations of AFE 420 may be used to wake up devices based on the receipt of an expected sound; for example, a mobile phone, pad, PC, etc, may be woken from a low power mode in response to detecting a particular word or phrase spoken by a user of the system. AFE 420 may be used to classify background sound conditions to provide context awareness sensing to assist in device operations. For example, speech recognition operation may be adjusted based on AFE 420 detecting that it is in an office, in a restaurant, driving in a vehicle or on train or plane, etc.

AFE 420 may also be used to detect special sounds to trigger alarms or surveillance camera, such as: a gunshot, glass break, talking, walking, car approaching, etc. It may detect abnormal operation conditions by sounds, such as: motor or engine operation, electric arc, car crashing, breaking sound, animal chewing power cables, rain, wind, etc.

Figure 5:
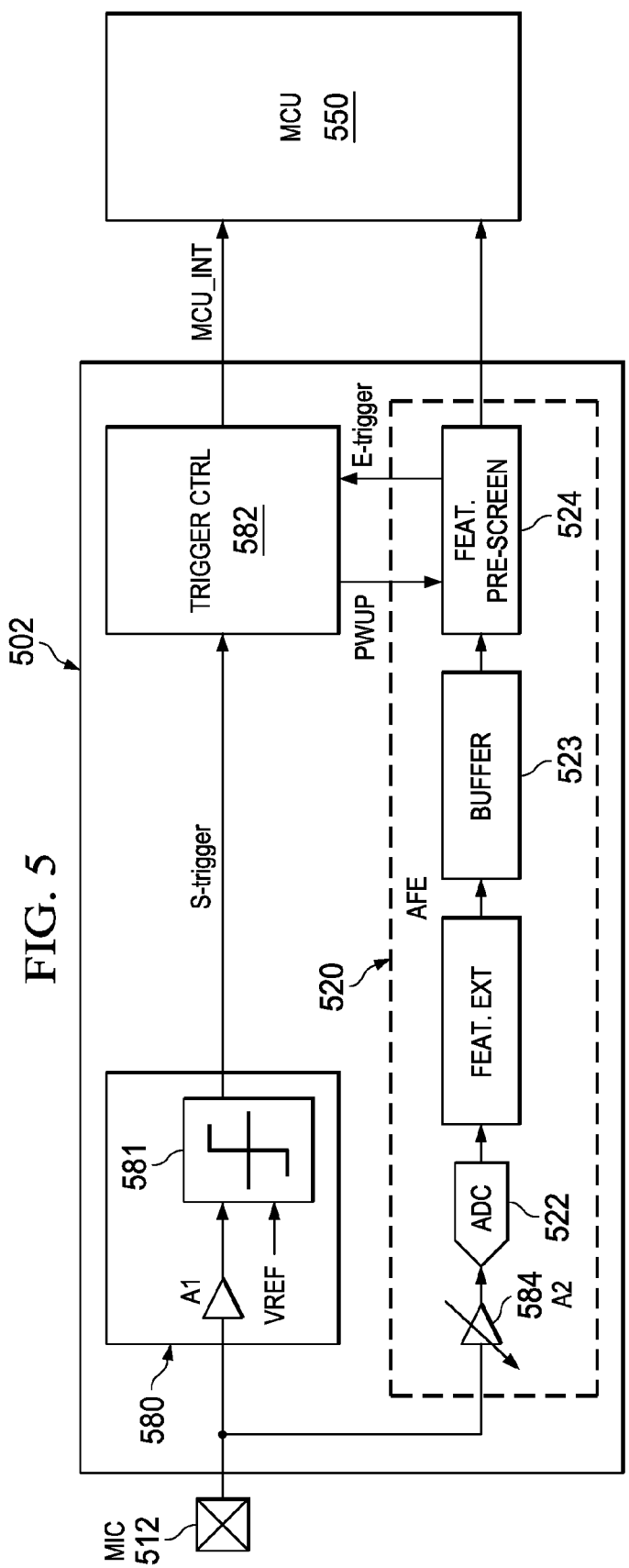
FIGS. 5 and 6 are detailed block diagrams of another A2I logic block.

FIG. 5 is a detailed block diagram of another A2I feature extraction system 502 in which analog front end channel 520 is illustrated. A2I logic block 502 also includes signal trigger logic 580. Signal trigger logic 580 evaluates the signal condition versus background noise to decide whether the following signal chain needs to be awakened. This may allow the AFE channel 520 logic to be placed in a power off state most of the time. When signal trigger logic 580 detects a certain amount of signal energy, then it may assert a "sound detected" trigger (S-trigger) control signal that turns on power for the AFE channel 520. Microcontroller 550 performs pattern recognition using digital signal processing techniques as described in more detail above.

A1, A2 are input gain blocks. The analog input 512 from a microphone may be compared with an analog threshold "Vref". Once it is higher than "Vref," an output of comparator 581 is switched from "0" to "1" to generate a trigger signal S-trigger indicating that a large input signal has been received. This is useful when the environment is very quiet. While the MIC input signal is below "vref", the whole AFE 520 may be placed in a power down mode until some larger sound comes in.

After S-trigger is switched to high, it will power-up AFE 520 to start collecting the input signal and do the frame-based feature extraction using ADC 522. However, to save power, trigger control block 582 may cause microcontroller 550 to remain off for a period of time while AFE 520 processes an initial set of frames. For example, AFE 520 may buffer an initial truncated set of several frames of sound features in buffer 523 and do a pre-screen by itself using feature pre-screen logic block 524. This allows pre-screen logic 524 to make sure the first few frames of features are very likely the targeted sound signature before waking up MCU 550 to collect the features and do a more complicated and accurate classification. For example, buffer 522 may buffer five frames that each represent 20 ms of analog signal.

Event trigger logic 582 may decide whether classifier 550 needs to wake up to run full signature detection, as discussed above. Event trigger 582 may be designed to rely on one AFE channel feature identified by pre-screen logic 524 or a combination of several channel features to signal a starting point. Pre-screen logic 524 may include memory that stores a database of one or more truncated sound signatures that may be compared against the truncated feature samples stored in buffer 523. When a match is detected, then an event trigger signal E-trigger is asserted to trigger control logic 582 that then causes MCU 550 to wake up and begin performing a rigorous sound recognition process on the sparse sound features being extracted from the analog signal provided by microphone 512.

In these blocks, MCU 550 is the most power hungry block, AFE 520 is second most power hungry block, comparator 581 used to generate S-trigger is a very low power design. Using this triggering scheme, the frequency of waking up the power hungry blocks is minimized and the power efficiency of the whole system is thereby maximized.

Figure 6:
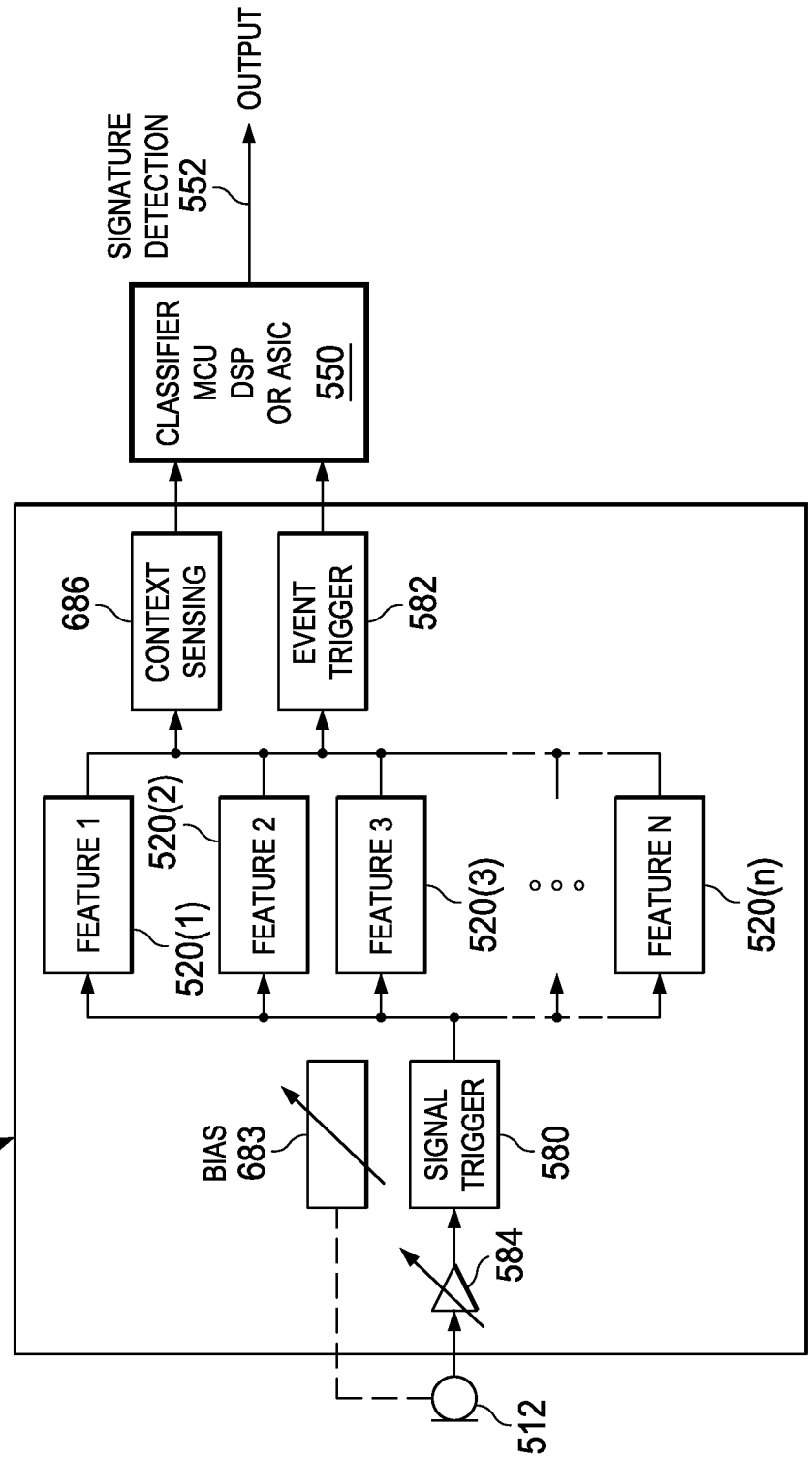

FIG. 6 is a detailed block diagram of another AFE A2I logic block 602 in which multiple analog channels 520(1)-520(n) are illustrated. Each AFE channel may operate on the input analog signal from microphone 512 to extract a different analog feature. For example, AFE channel 520(1) may extract zero-crossing information from the raw analog signal or from a filtered version of the analog input signal. AFE channel 520(2) may extract a total energy value from the analog signal. AFE channels 520(3)-520(n) may each contain a band pass, low pass, high pass or other type of filter and thereby extract an energy value based on a particular band of frequencies, for example.

Each AFE channel extract features directly using analog or low power mixed signal processing. Each feature may be sampled at very low rate, for example, the feature interval may be in the range of 5-20 ms. Typically, a spoken command word or other sound event may be approximately one second in duration; therefore features for a one second event may be extracted from only 200-50 frames, depending on frame length. The sparse features cannot be used to reconstruct speech content so privacy is protected; therefore, no eavesdropping is possible.

Other embodiments may include other types of analog signal processing circuits that may be tailored to extraction of sound information that may be useful for detecting a particular type of sound, such as motor or engine operation, electric arc, car crashing, breaking sound, animal chewing power cables, rain, wind, etc.

FIG. 7 is a plot illustrating a region of interest that may be initiated by a trigger signal from signal trigger logic 580. Trigger logic 580 may compare an energy value for a current frame against an average or cumulative energy value for a few preceding frames. For example, trigger logic 580 may be designed to compare an energy value for a current frame to an energy value from the two prior frames. When the current energy value of the current frame exceeds the energy values of the two preceding frames, then it asserts the signal trigger control signal to cause the AFE channels to be turned on.

For example, at the frame indicated at 702, frame energy exceeds the prior two frame energy values. The AFE channels are turned on for a sample window period of time indicated at 703, such as for one second. During sample window 703, the AFE channels extract sound information from the analog signal, as discussed above. After one second, the AFE channels are again turned off. At the frame indicated at 704, frame energy again exceeds the frame energy of the prior two frames and the AFE channels are again turned on for a one second period 705 to again allow feature extraction. After one second, the AFE channels are again turned off.

In this manner, power efficient feature extraction is only performed during a region of interest (ROI) that follows a spike in signal energy.

Referring again to FIGS. 5 and 6, an adjustable preamplifier 584 may be provided that allows the amplitude of the analog signal from microphone 512 to be normalized during operation to prevent saturation during periods of high background noise, for example. The gain of preamp 584 may be adjusted by context sensing circuit 686, for example. Context sensing circuit 686 typically operates periodically and may cause one or more of the AFE channels to be periodically turned on to sample the background noise level. Context sensing circuit 686 will be described in more detail later in this disclosure.

An adjustable bias circuit 683 may be provided to allow low power operation of MIC 512. Bias circuit 683 may be adjusted to vary the noise floor and sensitivity of the MIC based on different sound environments, as determined by context sensing module 686, for example. When MIC 512 is biased with a low current to reduce power consumption, it may exhibit a high noise floor and low sensitivity. Similarly, when biased with a higher bias current value from bias circuit 683, it may exhibit a lower noise floor and a higher sensitivity. Typically, a microphone consumes a large amount of power when biased at a default high current. Its power consumption may be comparable or larger than fully-power running AFE. To optimize the power of the whole system, MIC current bias may be adjusted with the low power triggering scheme discussed in above. Before S-trigger is switched to high, MIC 512 is low current biased and AFE 520 is powered off for power saving. When S-trigger goes to high, AFE 520 is powered up and MIC 512 is high-current biased to generate more accurate analog signal for feature extraction.

FIGS. 8-10 illustrate examples of robust A2I sound feature extraction. Frame based zero-crossing (ZC) count is a unique feature for pattern detection applications, such as voice command recognition or sound signature detection. It is typically easy to implement; however it may be vulnerable to circuit non-idealities and interference. These common-mode interference and circuit non-idealities may be removed or mitigated by extracting the ZC counts differentially thereby making ZC a very robust feature for signature detection. Several different schemes for extracting the differential ZC counts will now be described.

Differential ZC rate may be extracted in several different manners, such as: determining a difference in ZC rate between adjacent sound frames (time-domain), determining ZC rate difference by using different threshold voltage instead of only one reference threshold (amplitude-domain); determining ZC rate difference by using different sampling clock frequencies (frequency-domain), for example. These ZC rate difference may be used individually or be combined for pattern recognition.

FIGS. 8A-8D illustrate extraction of time-wise differential ZC rate. Extracting differential ZC rate is a very power and cost efficient solution; it doesn't needs extra filtering to clean an input signal or more power for better circuit performance. Typically, the implementation is very easy. There is almost no extra hardware complexity to produce a ZC rate difference. For example, for time-wise ZC difference, one ZC counter may be used for ZC counting. By recording the total ZC counts of a current and a previous frame a ZC difference between two frames may then be calculated.

In essence, time-wise differential ZC rate provides coherence information about the analog signal between adjacent frames. The more coherent time-wise, the less ZC rate difference. In human speech, vowel sounds produce a low differential ZC rate, while consonant sounds produce a large differential ZC rate.

Figure 8B:
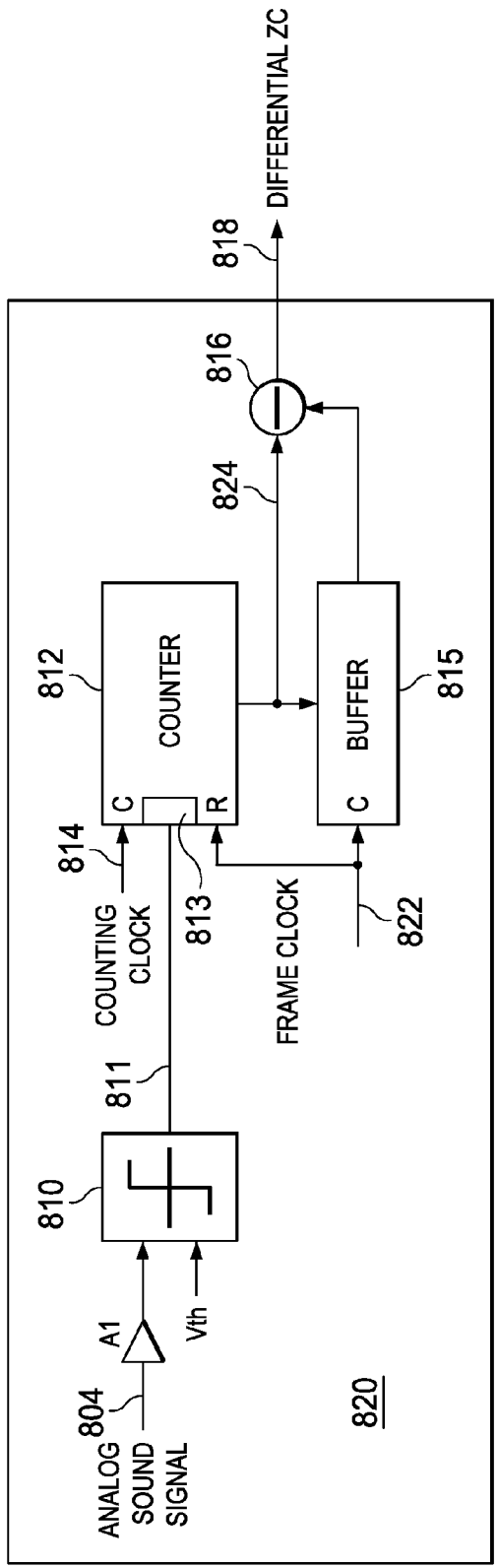

FIG. 8A illustrates a portion of an analog signal received from a microphone. FIG. 8B is a schematic for a channel circuit 820 to extract a time-wise differential ZC. Channel circuit 820 may be included within AFE 600 as another one of AFE channels 520(n), for example. As described above, sound features are extracted by slicing the analog signal into frames, as illustrated by frames 801, 802. Typically, for a given system or application, a frame size will be used that provides good results for the application. Typically, a frame size in the range of 1-40 ms will be selected. During each frame, the number of times the amplitude of the signal 804 crosses a threshold voltage Vth, as determined by comparator 810, may be counted in counter 812. In this example, a counting clock 814 is used to catch these crossings. A sampling circuit 813 latches the value of comparator output 811 on each period of counting clock 814. An exclusive-OR type circuit then indicates when the current value of comparator output 811 is different from the last sample in response to a zero crossing. Counter 812 is incremented each time sampling circuit 813 indicates a zero crossing has occurred. The frequency of the counting clock may affect final count value, since a slow counting clock may miss catching some of the zero crossings. At the end of each frame period, a count value is transferred to buffer 815 and counter 812 is reset by frame clock 822. Prior to each reset, subtractor 816 produces differential ZC value 818.

FIG. 8C illustrates an example analog signal 830 that may be received by ZC channel circuit 820. Frame clock 822 defines a frame length, while counting clock 814 counts the number of times the output 811 of comparator 810 crosses a threshold value. The threshold value may be zero volts for example, or it may be set at a higher or lower value. As mentioned above, the frequency of the counting clock may affect final count value, since a slow counting clock may miss catching some of the zero crossings, as illustrated during region 840 of this example.

FIG. 8D illustrates raw analog input signal 804 and time-wise differential ZC 818, while FIG. 8E illustrates and expanded portion of FIG. 8C.

Figure 9A:
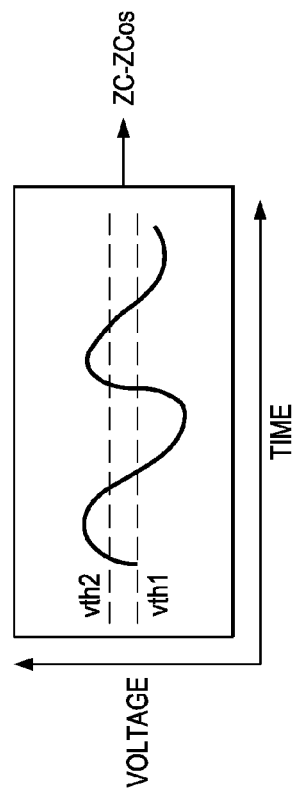

FIGS. 9A-9D illustrate amplitude-wise differential ZC extraction. FIG. 9A illustrates how two different levels of threshold may be set, Vth1 and Vth2, for example. The zero crossing counts detected for each threshold may then be subtracted to produce a differential ZC rate feature. The information about how the analog signal amplitude change affects the ZC counting provides a reliable metric for sound recognition. Typically, a larger threshold produces a smaller ZC rate, while a smaller threshold produces a larger ZC rate. The threshold values may be dynamically setup based on a previous frames' energy, or they may simply be static levels, for example. Two counter circuits similar to the circuit shown in FIG. 8B may be used to count the two ZC values. FIG. 9B is a plot illustrating ZC rate 902 at a Vth1 and another ZC rate 904 at an offset (ZCOS) threshold Vth2 for a sound signal 906 illustrated in FIG. 9D. In FIG. 9C, amplitude-wise differential ZC rate 908 illustrates the result of ZC 902-ZCOS 904. Amplitude-wise ZC extraction is insensitive to device non-idealities such as noise, offset, mismatch and command interference.

FIGS. 10A-10C are plots illustrating frequency-wise differential ZC rate extraction. ZCs that are counted by different clock frequencies will get different counts. A frequency-wise differential ZC may indicate a dominant frequency variation of an input signal. White noise, and ZC count is proportional to the frequency of the frame counting clock. In the human voice, a low frequency vowel produces a smaller ZC count using a differential clock. A high-frequency consonant may produce a larger ZC count.

A frequency-wise differential ZC rate extraction may be performed using two counters similar to FIG. 8B that are counted by different counting clocks but reset by the same frame clock. A frequency-wise differential ZC count provides a robust metric that is insensitive to device non-idealities such as noises, offset, mismatch and command interference.

FIG. 10A illustrates an example analog sound signal. FIG. 10B illustrates plots of ZC counts produced by several different counting clock frequencies. FIG. 10C illustrates differential ZC counts produced from different pairs of ZC counts from FIG. 10B.

FIGS. 11 and 12 illustrate two approaches for using A2I sparse robust sound features to recognize a spoken word or phrase. Rather than short phoneme or word recognition, an entire command sound signature, typically spanning 1-2 seconds, may be treated as a unique pattern. Good recognition results may be obtained for a whole sound signature pattern that typically contains one to five words.

Based on the sparse A2I features, a universal algorithm or a command specific algorithm may be defined based on each command to reach the best recognition performance. For example, a region of interest sampling window from A2I analog circuits may be for five seconds, during which average energy and/or zero-crossing features may be extracted based on every four frames (20 ms) or eight frames (40 ms) for 5 ms frames. In order to reduce the amount of memory that is required for storing features, in this example an average is taken across a set of four or eight 5 ms extraction frames. Simulation results indicate that the recognition accuracy is similar for both cases. Of course, other extraction frame lengths and/or averaging set sizes may be chosen In another example, the region of interest sampling window may only be one or two seconds long. These time-series features may then be fed into a standard pattern recognition classifier, such as: Neural Network, Classification Tree, Hidden Markov models, Conditional Random Fields, Support Vector Machine, etc, for example.

As illustrated in FIG. 7, each sample window may be initiated by detecting a starting point and then robust features are extracted directly from the analog sound signal during the following region of interest at a rate that is significantly lower than the Nyquist sampling rate.

FIGS. 11A-11B illustrate a time series sound signature detection example. In this example, one channel of total energy, three channels of low pass energy (0.5 kHz, 1 kHz, 1.5 kHz) and one channel of differential ZC rate are extracted from an analog signal as illustrated in FIG. 11A. In the example, the phrase "get directions" is being spoken.

FIG. 11B illustrates one channel 1102 corresponding to a low pass filter with a cutoff frequency of 500 Hz and one channel of differential ZC rate 1104. As described above, the robust features are then provided to a classifier that uses currently known or later developed pattern matching techniques to select the most likely command word signature from a database of word and phrase signatures that has been developed using known training techniques.

The sampling window may be slid along the stream of robust features in the digital domain using known signal processing techniques. For example, an attempt is made to match a pattern to features extracted from frame 1 to frame 50 for a one second pattern. If no match is found, then an attempt is made to match the pattern again to features for frame 2 to frame 51, etc, in case a correct starting point was not detected.

Test results show performance is good for short command recognition, with an equal error rate (EER)<0.5%. For example: "Take A Picture", "Open the Trunk", "Get Directions", etc. A user may speak at normal speed and tone. The commands should be said within the sampling window time period for a given application, such as within one second, for example. The technique is robust in noisy environments: >10 dB SNR is good enough. The technique may be configured to be speaker independent or speaker dependent. Table 1 summarizes simulation results for a command "Get directions."

The neural network (NN) score has a range of −1 to +1, where more positive indicates a higher degree of similarity between a stored signature and a pattern being recognized.

TABLE 1

Simulation results for "Get Directions"

| Threshold | | NN Score | | | | | | |
|---|---|---|---|---|---|---|---|---|
| | | 0.2 | 0.3 | 0.4 | 0.5 | 0.6 | 0.7 | 0.8 |
| Correct Recognition Rate | Genuine command (162k) | 99.8 | 99.73 | 99.54 | 99.18 | 98.35 | 96.87 | 93.61 |
| | Imposter commands (1000k) | 99.03 | 99.63 | 99.82 | 99.91 | 99.96 | 99.98 | 100 |

Figure 12A:
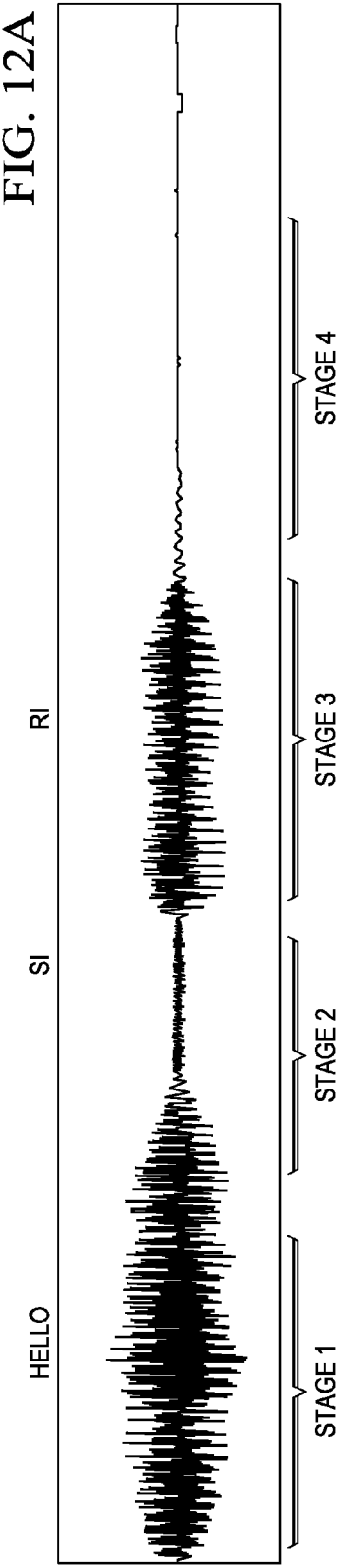
Figure 12B:
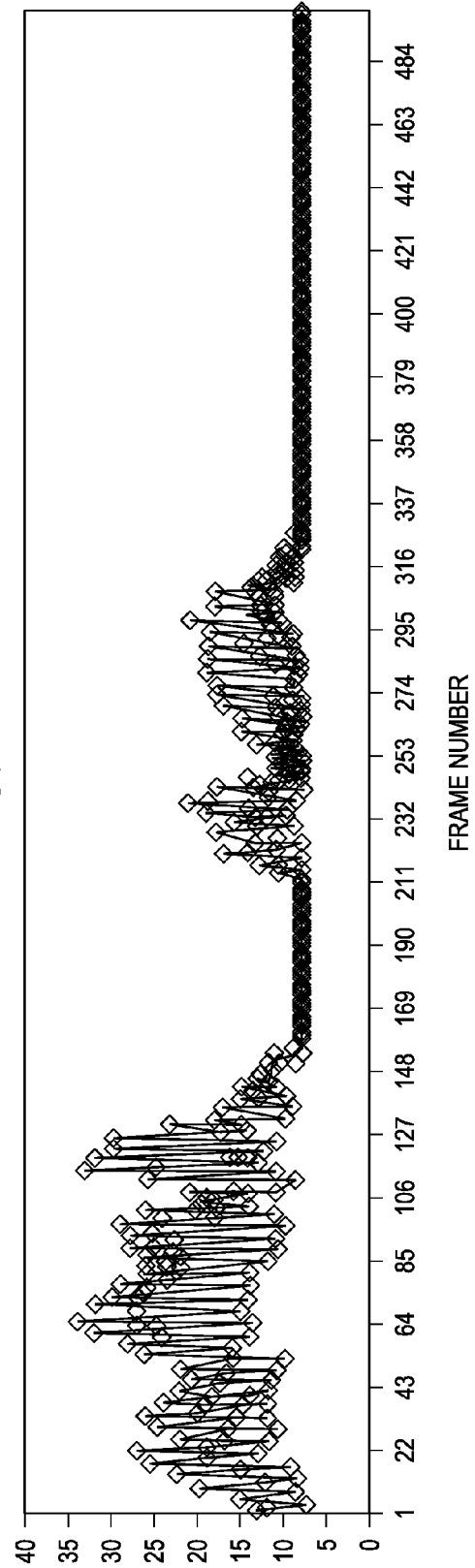

FIGS. 12A-12B illustrate a time-series, multi-stage approach for using A2I sparse sound features to recognize a spoken word or phrase. In this approach, a word or phrase is broken into smaller portions, such as phonemes, and a signature is trained for each portion. Recognition of a complete word or phrase may involve several sequential stages of recognition. During recognition, end point detection may be performed to determine the extent of each stage. FIG. 12A is a sound plot illustrating a spoken phrase: "hello Siri". In this example, the work "hello" is recognized in a first stage of pattern matching, "Si" is recognized in a second stage, and "ri" is recognized in a third stage. A fourth stage detects silence indicating an end to the command. The pattern recognition may be performed using known or later developed techniques, such as: a Hidden Markov model, a neural network, etc, for example. The multi-stage technique may be sensitive to correct end point detection, which is not an issue in the whole phrase detection technique illustrated in FIGS. 11A-11B.

FIG. 12B illustrates a plot of the robust differential ZC rates extracted from the analog signal for this speech sequence. As discussed above, additional energy and ZC feature channels may also be extracted to assist in pattern recognition.

Cloud-Based Training

Figure 13:
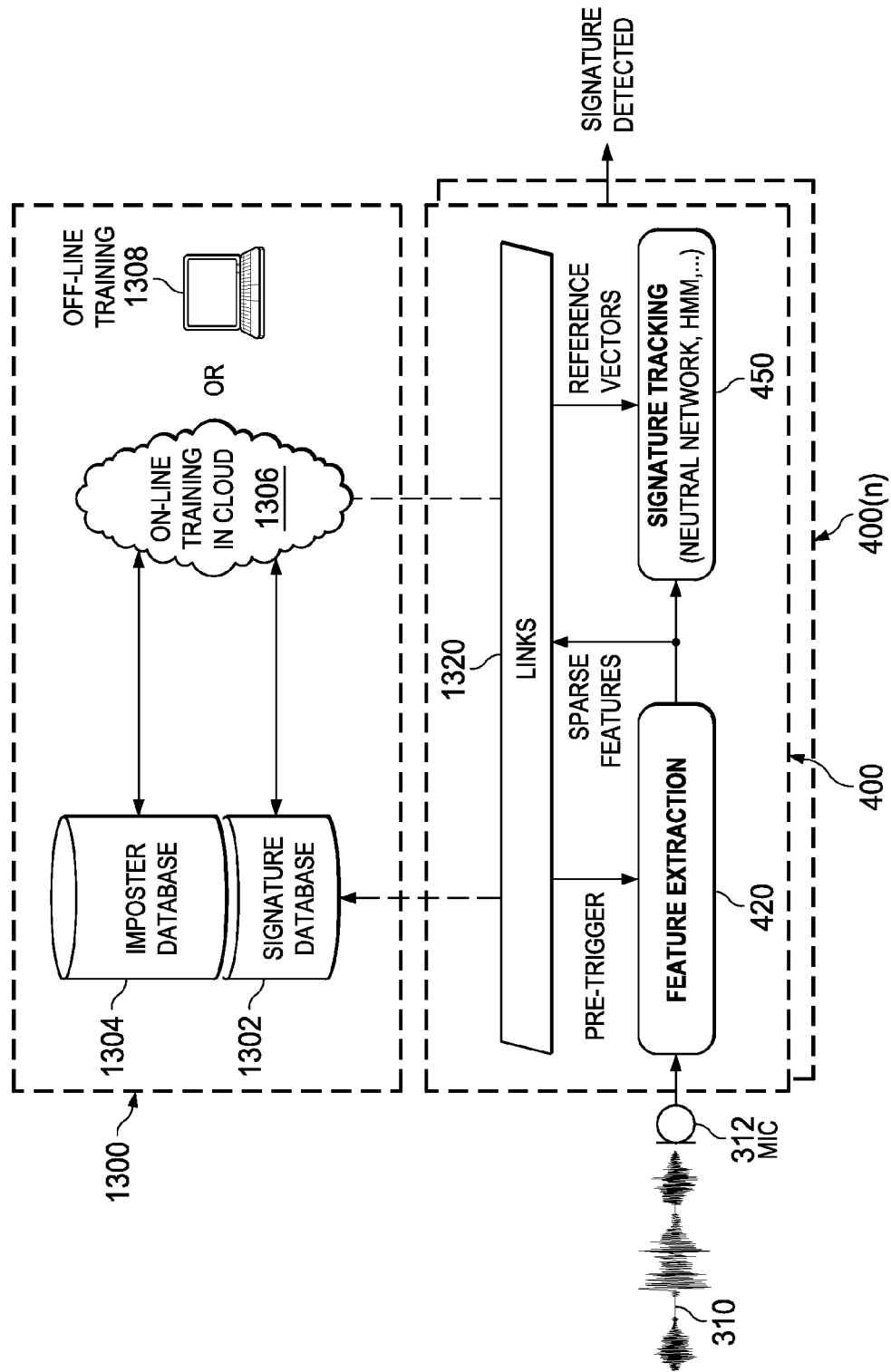
FIGS. 13 and 14 are block diagrams of the system of FIG. 4 interacting with a cloud based sound recognition training system.

FIG. 13 is a block diagram illustrating recognition system 400 interacting with a cloud based sound recognition training system 1300. Training server 1300 includes signature databases 1302, 1304 that may be collected from a large number of distributed recognition systems 400(*n*). Each remote recognition system 400(*n*) may be part of a mobile phone, tablet, pad or other entertainment or communication system, for example. Recognition system 400 may be included in vehicles for driving or entertainment control, for example. Each recognition system 400 may be in communication with cloud based training server 1300 using known means of communication, such as a cellular data channel, WIFI, or other type of wireless channel, for example, that is supported by link circuitry 1320.

Training server 1300 maintains a database 1302 of sound signatures that have been developed using known or later developed training schemes 1308 based on sparse sound features as described herein. Typically, voice samples taken from a number of people are used to create a signature that is then speaker independent. Training server 1300 may also maintain a database 1304 of imposter sound signatures. These may be signatures of non-voice events, such as: noise, tapping, doors opening/closing, music, etc, for example. Training server 1300 may be configured to create application specific signature databases that are provided to various recognizers

400(n). An application specific signature database may be downloaded to a recognizer 400(n) when it is initially configured, for example. Additional or different application specific database portions may be downloaded to a recognizer 400(n) when it starts a new application, for example. In this manner, each recognizer 400(n) may have a signature database that is configured to be compatible with a specific recognition application.

Each recognition system 400(n) maintains a local database of sound signatures that it uses to recognize words and commands. During the course of operation, occasionally a spoken word or command may be falsely accepted or falsely rejected. The false acceptance rate (FAR) and false rejection rate (FRR) are metrics that measure these errors. An application may be configured to try to determine when a recognition error occurs. For example, if the system falsely accepts a command that the user did not intend, then a following inconsistent action by the user may be used by the system to infer that a recognition error was made. Similarly, if the system falsely rejects a command, a user will typically repeat the command. The system may be able to keep track of repeated sounds and infer that a recognition error was made.

When recognizer 400(n) determines that a recognition error has occurred, it may send a copy of the extracted sound features from a sample window along with an indication of which sound signature was incorrectly selected and the type of error to training server 1300 via a wireless link. This may be done immediately in some implementations; other implementations may collect several sets of errors and only send them periodically or in response to a query from training server 1300, for example.

As training server 1300 receives sample packets from various recognition systems 400(n), it may use the received sample packets to perform online training 1306 to improve the signature database. The training may be performed using known or later developed training techniques using the sparse sound samples collected from multiple diverse recognition systems 400(n).

Periodically, training server 1300 may send a revised signature database to a recognition system 400(n) after a training session has been performed. A signature database update may be done based on a periodic schedule, for example, during which a request for recent sound parameter info may be sent to one or more remote recognition systems 400(n). In some implementations, a signature database update may be provided in response to a request from a recognition system 400(n), or in response to a recognition system 400(n) sending an error sample, for example.

In this manner, each recognition system may be minimized to store only a portion of a signature database that is needed for an active application. Furthermore, recognition system 400(n) does not need to be capable of performing local training, which may thereby reduce complexity and power consumption.

Figure 14:
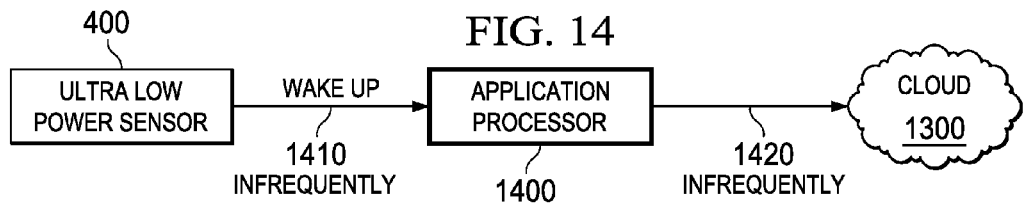

FIG. 14 is a flow diagram illustrating interaction of recognition system 400 with cloud based training system 1300. Most of the time, recognition system 400 may be in a low power sleep mode. As described above in more detail, when a sound is detected that exceeds a background threshold, a portion of recognizer 400 is awoken to perform further analysis of the received sound. If an initial analysis indicates a possible command word is being received, then additional classification circuitry 550 may be awoken. An application processor 1400 may be activated 1410 in response to a recognized command word or phrase. As long as a successful recognition occurs, recognizer 400 and application processor 1400 may operate autonomously from training server 1300. Typically, application processor 1400 is activated only infrequently in response to a command recognized by recognition system 400.

Application processor 1400 may be coupled to link hardware 1320, referring again to FIG. 13, to initiate and control information exchanges with cloud based training server 1300. Application processor 1400 may be one of various types of microprocessors, microcontrollers, digital signal processor, etc, for example.

Interaction 1420 with training server 1300 needs to occur only when a recognition error occurs. In this manner, the distributed recognition systems 400(n) may operate in low power modes, but have the power of the cloud based training server 1300 available when needed.

The cloud based training server 1300 may routinely request sound parameters from recognizer 400 to calibrate sound sensor 400 to the environment. For example, for an application where the environment is expected to be relatively stable, calibration may be performed on a weekly basis. However, when a more dynamic environment is expected, training may be performed more frequently, such as hourly or even more often, for example.

Local sound sensor 400 may routinely send sound parameters extracted from a current environmental background sounds to remote training server 1300 even without an occurrence of an error in order to refine the local database of sensor 400. In response to a request or query from sensor 400 that includes background sound parameters, cloud based training server 1300 may provide a retrained sound parameter database.

Context Awareness

A mobile or stationary device may further adjust its performance and status to get the best communication performance and maximum power saving by being aware of its current context. It is very difficult to reliably and accurately sense a devices' location based on GPS or cell tower triangulation, for example; however, sounds detected by the device's microphone may provide very cost effective information to assist in this function. For example, when a mobile device is in a pocket or a bag, the false alarm rate of keyword detection needs to be reduced to a minimum, the display should be turn off and buttons should be less sensitive to pressure. When mobile device is in a user's hands or in open air, the detection hit rate may need to be increased, even if the false alarm rate is increased as well.

By making use of the multi-stage triggering mechanisms described above, a device may be always listening and checking the environment without dissipating much power. As described above, this is done by waking various portions of the device in different working modes in response to detected sounds. A signature detection threshold may be automatically tuned based on user security and convenience requirements and according to environment changes.

As described previously, an ultra low power analog front end section may continuously compare an incoming analog signal from a microphone with long-term background conditions to decide whether to wake up a following A2I logic module that may extract sound features directly from the analog circuit. When a significant change from the long-term background level occurs, a signal trigger may be asserted to awaken the A2I logic module. Once it is awakened, the A2I logic module may remain on for a relatively long period of time, such as one second, for example. While it is awake, the A2I logic module will begin extracting sound features from each frame of the analog signal and analyze extracted features from a small number of frames, such as five 20 ms frames, for example. If the A2I logic detects a pattern that might be an expected command word or phrase, it may then assert an event trigger to awaken a next stage of logic that is equipped to perform full sound or speech recognition using a long sequence of the A2I sound features.

A context awareness logic module may regularly sample A2I features and buffer a representative portion of them locally. Once the context awareness logic module collects enough information, or when an abruptly changing condition occurs, it may either update a context indicator locally or assert a context trigger to cause a following digital classifier to update environment conditions.

A sound signature detection threshold may then be adjusted based on the current detected environment. For example, in a time series detection process as described in more detail with regard to FIGS. 11 and 12 a detection threshold, such a neural net (NN) score may be changed according to environment changes.

By using context awareness sound signature detection solution, the mobile device can further adjust its performance and status to get the best communication performance and maximum power saving. The device may be always listening or checking the environment using an ultra low power analog front end stage, while the multi-stage trigger will wake the device in different working modes to conserve power.

For example, various types of background sound conditions may be classified to assist device operations, such as: home, office, restaurant, driving, trains, plane, bus, in a purse or bag, in a pocket, in open air, etc. Recognition performance may be improved by using a portion of a signature database that has been trained under similar background noise conditions, for example.

Context awareness sensing may also be applied to sensors used to detect special sounds to trigger alarms or surveillance cameras, for example. By continually being aware of current environmental background sounds, a sensor may be better able to detect sounds of interest, such as: gunshot, glass break, talking, walking, car approaching, etc, for example. Similarly, by continually being aware of current environmental background sounds, a sensor may be better able to detect abnormal operation conditions, such as: motor or engine problems, electrical arcing, car crashing, breaking sounds, animal chewing power cables, rain, wind, etc, for example.

Figure 15A:
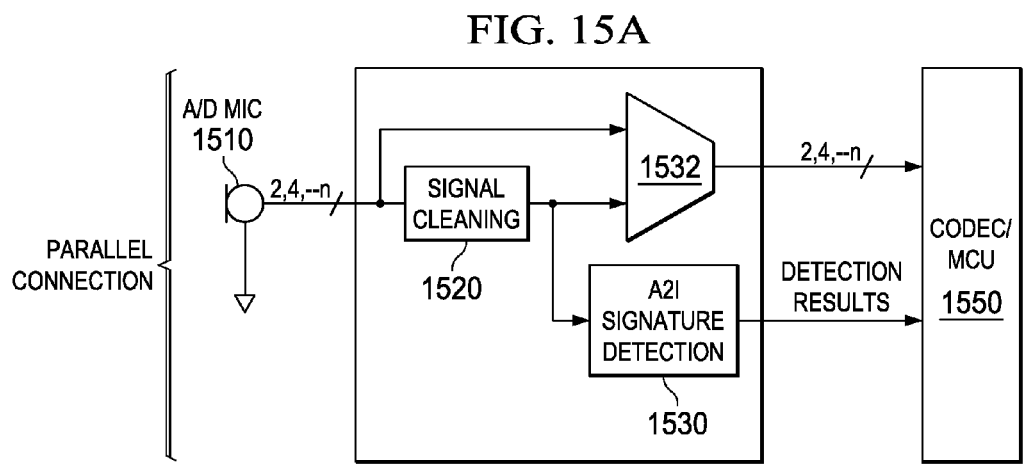
FIGS. 15A and 15B are block diagrams illustrating examples of interfacing a microphone to a backend system in conjunction with A2I detection results.
Figure 15B:
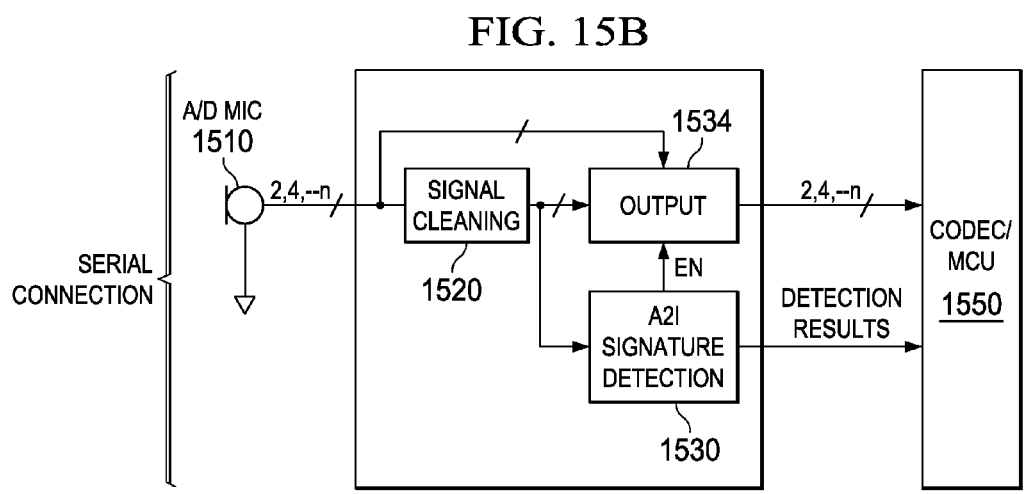
Figure 16A:
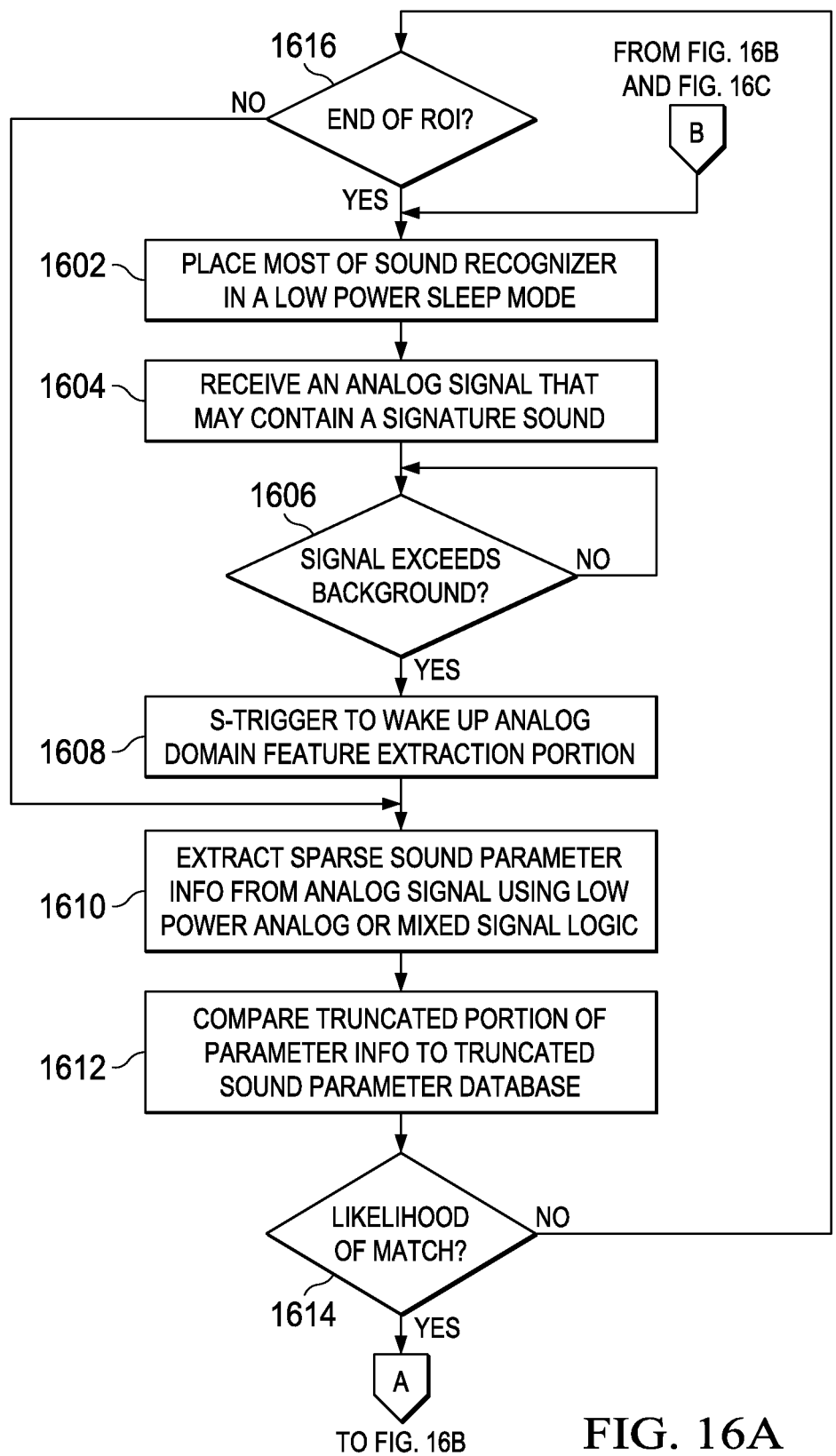
FIGS. 16A-16E are flow diagrams illustrating operation of a low power sound recognition system.
Figure 16B:
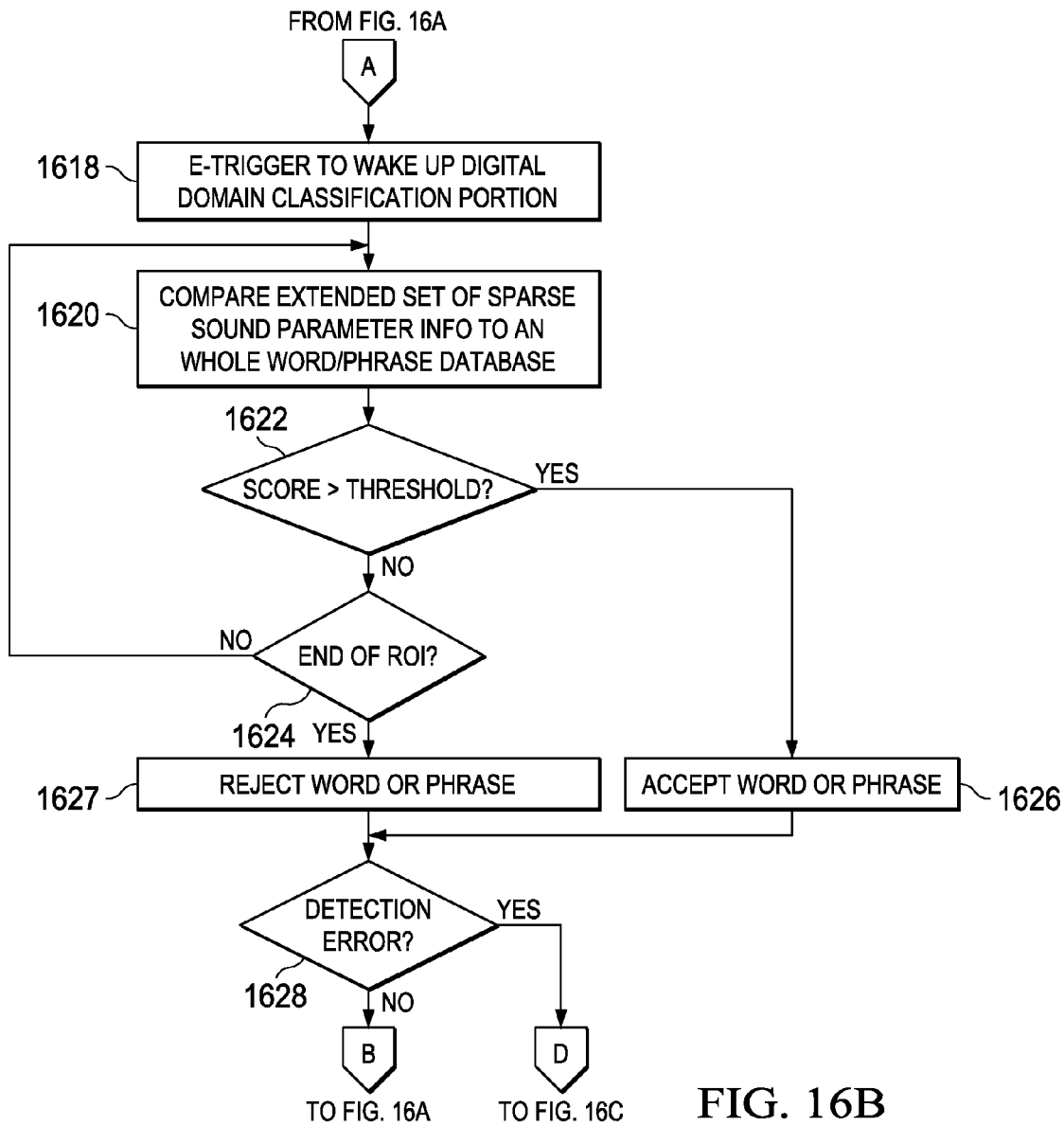
Figure 16C:
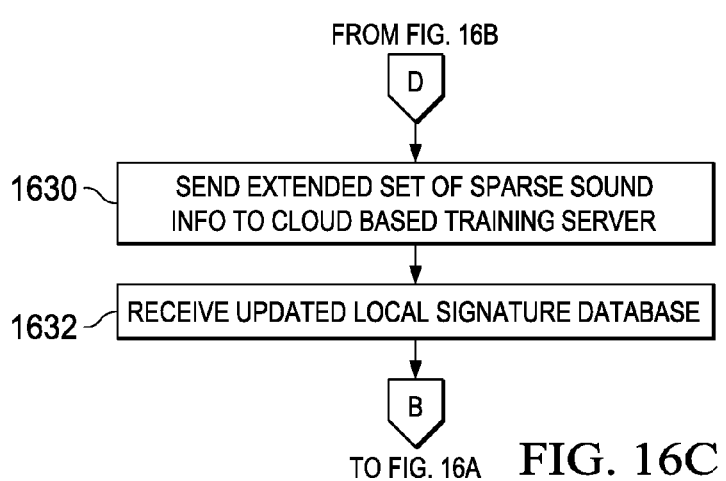
Figure 16D:
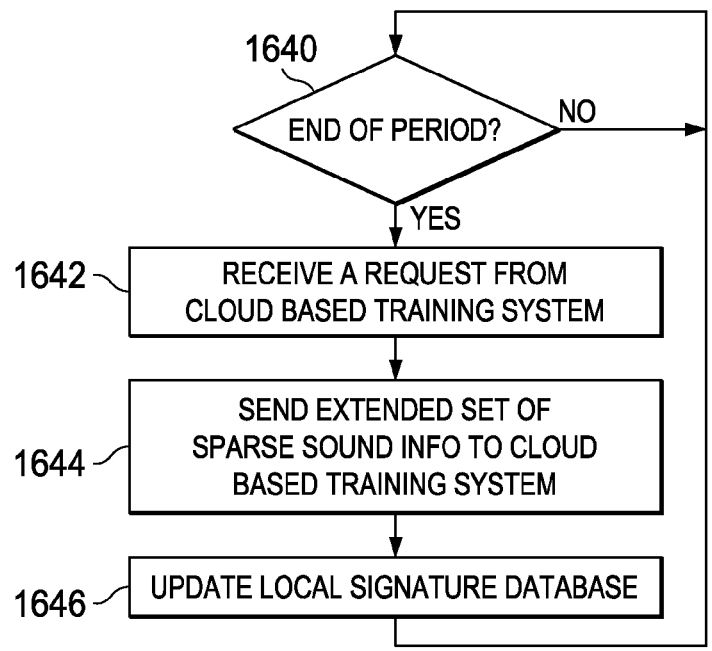
Figure 16E:
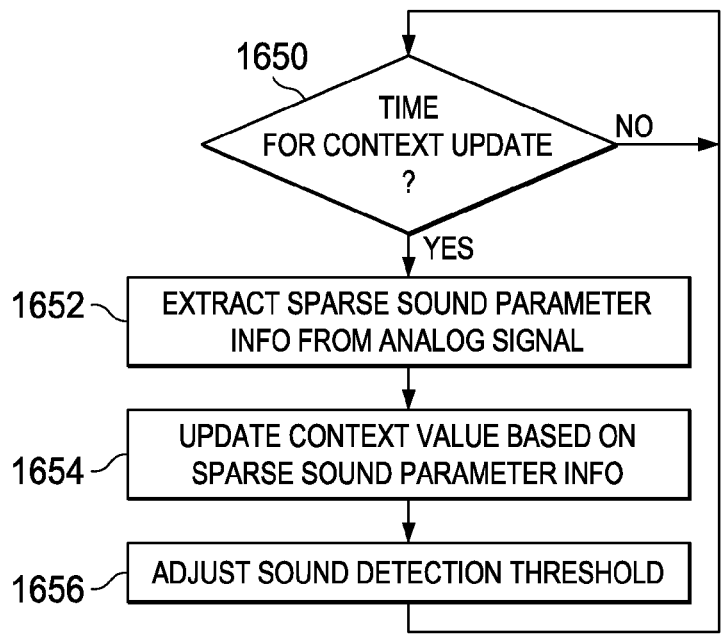

FIGS. 15A and 15B are block diagrams illustrating examples of interfacing a microphone 1510 to a backend system 1550 in conjunction with A2I detection results. An A2I chip may be designed to connect to multiple types of microphones (MIC), such as either analog or digital types of microphones.

A universal connection may be provided that will accept either a digital MIC (DMIC) or analog MIC (AMIC) using a same configuration of signal pin inputs. An internal circuit may auto-detect the input type (analog/digital) of the MICs using known or later developed techniques.

An A2I module 1530 may use a dedicated MIC, not illustrated, or share MIC 1510 with other modules, such as backend unit 1550 that may include a CODEC (coder/decoder) that may perform various known types of signal processing to the audio signal. Backend unit 1550 may also include a microcontroller (MCU) that may control the operation of the CODEC, for example.

For a digital MIC, its output may be a digital pulse density modulated (PDM) stream that has to be filtered to get the final decimated digital output, which is digitized raw data of input sound. In that case, the features will be still extracted based on frames, but need not to be quantized, since it happens in the digital domain instead of analog.

FIG. 15A illustrates a parallel connection between MIC 1510, A2I signature detection module 1530 and backend unit 1550. Signal cleaning logic 1520 may filter the signal received from MIC 1550 using known filter techniques to remove or enhance various frequencies. The raw sound stream from MIC 1510 or the filtered signal from filter 1520 may be provided directly to CODEC 1550 via mux 1532. A2I signature detection module 1530 operates in a manner as described in more detail above to continually monitor an input signal from MIC 1510 and detect when a sound, word or phrase, or event of interest is heard by MIC 1510. When an event is detected, A2I module 1530 may then provide the detection results to the MCU in backend unit 1550. In this manner, a single microphone may be used with light loading on the MIC output, and the CODEC will not see the existence of A2I unit 1530.

FIG. 15B illustrates a serial connection between MIC 1510 and the CODEC in backend unit 1550. Based on detection decisions made by A2I module 1530, selector 1534 may be controlled to enable/disable MIC signal to backend system 1550. In this manner, a CODEC module in backend system 1550 can be selectively connected to MIC 1550 only when an event of interest has been detected by A2I module 1530.

FIGS. 16A-16E are flow diagrams illustrating various aspects of the operation of a low power sound recognition module. As discussed above, the sound recognition module may provide command recognition for various types of systems, such as: mobile phone, remote control, security system, automobile, etc. Initially, the sound recognition module along with all or a portion of the rest of the system may be placed 1602 in a low power sleep mode, in which only a very small amount of analog detection logic in the sound recognition module remains active. The active analog detection logic may then monitor an analog signal received from a microphone that is connected to the sound recognition module.

Most of the time, a user may not be actively interacting with the system, in which case the microphone may pick up background noise and sounds. During this period, the active analog detection logic will be receiving 1604 an analog signal that normally contains background noises and sounds; however, when the user does speak a command, the analog may contain an expected sound. Since the expected sound is a command word or phrase, the expected sound has a defined length in time. A region of interest (ROI) time period may be defined based on the expected length of time of any valid word or phrase that the sound recognition module is configured to recognize.

As described earlier in more detail, the analog detection logic may compare sound level energy during a current time frame with sound levels during several prior time frames in which only background noise was occurring. When the signal exceeds 1606 the background noise level, then a sound trigger (s-trigger) signal may be asserted 1608 to awaken and trigger an analog feature extraction portion of the sound recognition module. As described above in more detail, the analog feature extraction circuitry may contain multiple channels of filters, zero crossing detectors, etc that are configured to extract 1610 sparse A2I sound parameter information from the analog signal. The low power analog feature extraction circuitry may be completely analog, or may be a mix of analog and low power digital circuitry, for example. As described above in more detail, the analog feature extraction circuitry may operate at a low sampling rate, such as 500 samples per second or lower, even as low as 50 samples per second, for example.

As described in more detail above, the sparse A2I sound parameter features may be sound energy levels from the entire analog signal or from various filtered bands of the analog signal. Sparse sound parameters may also include time frame based differential zero crossing rates, for example. As described in more detail above, a differential ZC rate may be extracted in several different manners, such as: determining a difference in ZC rate between adjacent sound frames (time-domain), determining ZC rate difference by using different threshold voltage instead of only one reference threshold (amplitude-domain); determining ZC rate difference by using different sampling clock frequencies (frequency-domain), for example. These ZC rate difference may be used individually or be combined for pattern recognition.

Each time the feature extraction circuitry is triggered, an initial truncated portion of the sound parameter information is compared 1612 to a truncated sound parameter database stored locally with the sound recognition sensor to detect when there is a likelihood that the expected sound is being received in the analog signal. As described above in more detail, the truncated portion may cover a span of just five time frames that each represent 20 ms of the analog sound signal, for example. Various implantations may use longer or shorter time frames and fewer or more frames during this event detection activity.

When a likely match between the truncated portion of the sound parameter information and the truncated signature database exceeds a threshold value 1614, then an event trigger (e-trigger) signal may be asserted 1618 to awaken and trigger digital classification logic.

If no likely match is detected 1616 during the ROI time period, then the feature extraction circuitry is again placed 1602 into a sleep state.

The extracted A2I sparse sound parameter information is processed 1620 using the digital classification portion to identify expected sounds or speech contained in the analog signal after the trigger signal is generated. As described above in more detail, these sparse time-series features may be processed by comparing them to a local sound signature database of whole words or phrases using a standard pattern recognition classifier, such as: Neural Network, Classification Tree, Hidden Markov models, Conditional Random Fields, Support Vector Machine, etc, for example.

When a classification score exceeds a threshold value 1622, then the spoken word or phrase is accepted 1626. When a detection score does not exceed the threshold 1622 during the ROI 1624, then the spoken command is rejected 1627. As described above in more detail, a user or a designer of the system may set or adjust the threshold value to balance the false rejection rate (FRR) and false acceptance rate (FAR).

When a command word or phrase is accepted 1626, additional portions of the mobile or stationary system may be powered on to respond to the recognized command word.

As described above in more detail, in some implementations a cloud based training server may be utilized to improve recognition rates. In this case, when a command word detection error occurs 1628, the extended set of sparse sound parameters that were collected over the ROI time period may be transmitted 1630 to the cloud based training server. As described in more detail above, a detection error may be inferred by the system based on subsequent input from a user after the acceptance or rejection of a spoken word.

As described in more detail above, the cloud based training server may then use the sound parameter information received from the remote sound recognition system to improve the signature database. An updated signature database may then be returned 1632 to the remote recognition system. As the training server receives sample packets from various recognition systems, it may use the received sample packets to perform online training to improve the signature database. The training may be performed using known or later developed training techniques using the sparse sound samples collected from multiple diverse recognition systems.

Periodically 1640, the cloud based training server may send 1646 a revised signature database to the recognition system after a training session has been performed. The cloud based training system may send a request 1642 for recent sound parameter info to one or more remote recognition systems. The received recent sound parameter info may then be used by the cloud based training server to perform training. A signature database update may be done based on a periodic schedule 1640, for example. In some implementations, a signature database update may be provided in response to a periodic request 1642 from a recognition system, or in response to a recognition system sending an error sample 1632, for example.

As described above in more detail, a mobile or stationary device may further adjust its performance and status to get the best communication performance and maximum power saving by being aware of its current context. By making use of the multi-stage triggering mechanisms described above, a device may be always listening and checking the environment without dissipating much power.

A context awareness logic module may regularly 1650 sample and extract 1652 A2I features and buffer a representative portion of them locally. Once the context awareness logic module collects enough information, or when an abruptly changing condition occurs, it may either update 1654 a context indicator locally or assert a context trigger to cause a following digital classifier to update environment conditions.

A sound signature detection threshold may then be adjusted 1656 based on the current detected environment. For example, in a time series detection process as described in more detail with regard to FIGS. 11 and 12 a detection threshold, such a neural net (NN) score may be changed according to environment changes. In this manner, the sound parameter information is compared to both the context value and a signature sound parameter database stored locally with the sound recognition sensor to identify sounds or speech contained in the analog signal, such that identification of sound or speech is adaptive to the current environmental condition.

System Example

Figure 17:
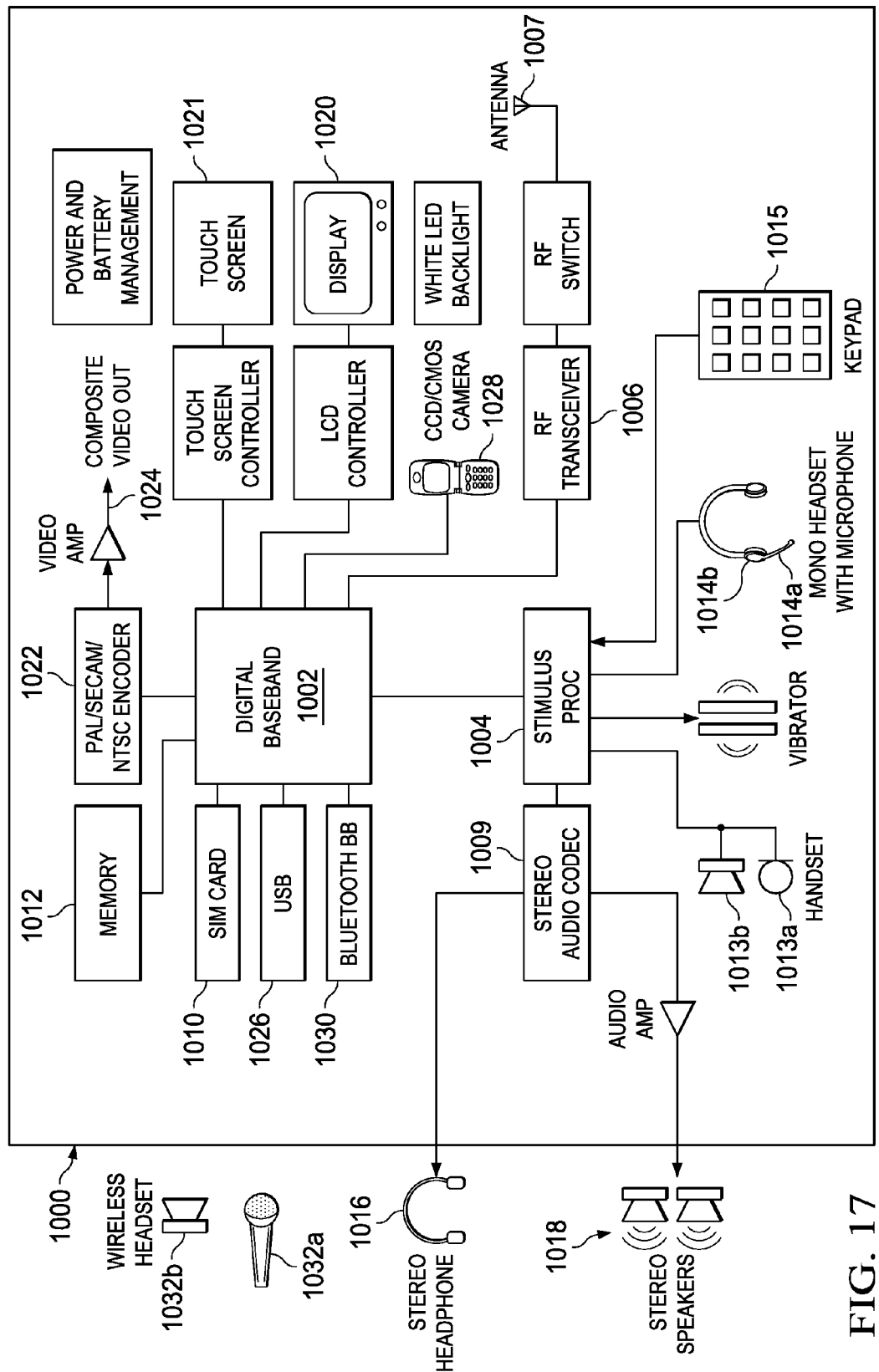
FIG. 17 is a block diagram of a system that utilizes A2I sparse sound features for sound recognition.

FIG. 17 is a block diagram of example mobile cellular phone 1000 that utilizes A2I sparse sound features for command recognition. Digital baseband (DBB) unit 1002 may include a digital processing processor system (DSP) that includes embedded memory and security features. Stimulus Processing (SP) unit 1004 receives a voice data stream from handset microphone 1013*a* and sends a voice data stream to handset mono speaker 1013*b*. SP unit 1004 also receives a voice data stream from microphone 1014*a* and sends a voice data stream to mono headset 1014*b*. Usually, SP and DBB are separate ICs. In most embodiments, SP does not embed a programmable processor core, but performs processing based on configuration of audio paths, filters, gains, etc being setup by software running on the DBB. In an alternate embodiment, SP processing is performed on the same processor that performs DBB processing. In another embodiment, a separate DSP or other type of processor performs SP processing.

SP unit 1004 may include an A2I sound extraction module with multiple triggering levels as described above in more detail that allows mobile phone 1000 to operate in an ultralow power consumption mode while continuously monitoring for a spoken word command or other sounds that may be configured to wake up mobile phone 1000. Robust sound features may be extracted and provided to digital baseband module 1002 for use in classification and recognition of a vocabulary of command words that then invoke various operating features of mobile phone 1000. For example, voice dialing to contacts in an address book may be performed. Robust sound features may be sent to a cloud based training server via RF transceiver 1006, as described in more detail above.

RF transceiver 1006 is a digital radio processor and includes a receiver for receiving a stream of coded data frames from a cellular base station via antenna 1007 and a transmitter for transmitting a stream of coded data frames to the cellular base station via antenna 1007. RF transceiver 1006 is coupled to DBB 1002 which provides processing of the frames of encoded data being received and transmitted by cell phone 1000.

DBB unit 1002 may send or receive data to various devices connected to universal serial bus (USB) port 1026. DBB 1002 can be connected to subscriber identity module (SIM) card 1010 and stores and retrieves information used for making calls via the cellular system. DBB 1002 can also connected to memory 1012 that augments the onboard memory and is used for various processing needs. DBB 1002 can be connected to Bluetooth baseband unit 1030 for wireless connection to a microphone 1032a and headset 1032b for sending and receiving voice data. DBB 1002 can also be connected to display 1020 and can send information to it for interaction with a user of the mobile UE 1000 during a call process. Touch screen 1021 may be connected to DBB 1002 for haptic feedback. Display 1020 may also display pictures received from the network, from a local camera 1028, or from other sources such as USB 1026. DBB 1002 may also send a video stream to display 1020 that is received from various sources such as the cellular network via RF transceiver 1006 or camera 1028. DBB 1002 may also send a video stream to an external video display unit via encoder 1022 over composite output terminal 1024. Encoder unit 1022 can provide encoding according to PAL/SECAM/NTSC video standards. In some embodiments, audio codec 1009 receives an audio stream from FM Radio tuner 1008 and sends an audio stream to stereo headset 1016 and/or stereo speakers 1018. In other embodiments, there may be other sources of an audio stream, such a compact disc (CD) player, a solid state memory module, etc.

Other Embodiments

While the invention has been described with reference to illustrative embodiments, this description is not intended to be construed in a limiting sense. Various other embodiments of the invention will be apparent to persons skilled in the art upon reference to this description. For example, while a two level (S-trigger, E-trigger) triggering scheme was described herein, in other embodiments a single level may be used, or additional levels may be included by further subdividing operation of the digital domain, for example.

In another embodiment, no power triggering is used and all analog and digital logic is powered up all of the time. Extraction of sparse sound features may be used to reduce the size of signature databases, even for a system that is not sensitive to power usage.

While use of low power sigma-delta ADC was described herein, other embodiments may use other currently known or later developed ADC technology.

Various aspects described herein may be applicable to all manner of sound or voice activated systems, including simple metering or security systems to complex word or phrase activated systems.

Some embodiments may include many, or all of the aspects described herein, while other embodiments may include only one or a few aspects.

The techniques described in this disclosure may be implemented in analog or mixed signal hardware in which some digital logic is combined with low power analog logic. As used herein, the term "analog logic" may also refer to mixed signal analog circuits that include some amount of digital logic.

Some aspects of the techniques described herein may be implemented in hardware, software, firmware, or any combination thereof. If implemented in software, the software may be executed in one or more processors, such as a microprocessor, application specific integrated circuit (ASIC), field programmable gate array (FPGA), or digital signal processor (DSP). The software that executes the techniques may be initially stored in a computer-readable medium such as compact disc (CD), a diskette, a tape, a file, memory, or any other computer readable storage device and loaded and executed in the processor. In some cases, the software may also be sold in a computer program product, which includes the computer-readable medium and packaging materials for the computer-readable medium. In some cases, the software instructions may be distributed via removable computer readable media (e.g., floppy disk, optical disk, flash memory, USB key), via a transmission path from computer readable media on another digital system, etc.

Certain terms are used throughout the description and the claims to refer to particular system components. As one skilled in the art will appreciate, components in digital systems may be referred to by different names and/or may be combined in ways not shown herein without departing from the described functionality. This document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" and derivatives thereof are intended to mean an indirect, direct, optical, and/or wireless electrical connection. Thus, if a first device couples to a second device, that connection may be through a direct electrical connection, through an indirect electrical connection via other devices and connections, through an optical electrical connection, and/or through a wireless electrical connection.

Although method steps may be presented and described herein in a sequential fashion, one or more of the steps shown and described may be omitted, repeated, performed concurrently, and/or performed in a different order than the order shown in the figures and/or described herein. Accordingly, embodiments of the invention should not be considered limited to the specific ordering of steps shown in the figures and/or described herein.

It is therefore contemplated that the appended claims will cover any such modifications of the embodiments as fall within the true scope and spirit of the invention.

What is claimed is:

1. A method for operating a sound recognition sensor, the method comprising:
receiving an analog signal that may contain a signature sound;
extracting sound parameter information from the analog signal;
comparing the sound parameter information to a sound parameter reference stored locally with the sound recognition sensor to detect when the signature sound is received in the analog signal;

generating a trigger signal when a signature sound is detected;

sending a portion of the extracted sound parameter information to a remote training location for adaptive training when a signature sound detection error occurs; and receiving an updated sound parameter reference from the remote training location in response to the adaptive training.

2. The method of claim 1, further comprising:

periodically receiving a request from the remote training location; and sending a portion of the extracted sound parameter information to the remote training location for adaptive training in response to the request from the remote training location.

3. The method of claim 1, further comprising:

periodically sending a portion of the extracted sound parameter information to the remote training location for adaptive training.

4. The method of claim 1, wherein the signature sound is a spoken word.

5. The method of claim 1, wherein extracting sound parameter information from the analog signal is performed using an analog portion of the sound recognition sensor.

6. The method of claim 1, wherein extracting the sound parameters is performed at a sample rate of less than or equal to approximately 500 samples per second.

7. The method of claim 4, wherein the sample rate is approximately 50 samples per second.

8. A method for operating a sound recognition system, the method comprising:

receiving at a training location for adaptive training a set of extracted sound parameters from a distributed sound sensor;

performing an adaptive training operation on a sound parameter reference using the set of extracted sound parameters; and sending an updated sound parameter reference from the training location to the distributed sound sensor in response to the adaptive training.

9. The method of claim 8, wherein receiving the set of extracted sound parameters occurs when a signature sound detection error occurs in the distributed sound sensor.

10. The method of claim 8, wherein receiving the set of extracted sound parameters occurs periodically.

11. The method of claim 8, further comprising:

sending a request from the training location to the distributed sound sensor to send sound parameter information; and wherein receiving the set of extracted sound parameters occurs in response to the request.

12. An apparatus for recognizing a sound, the apparatus comprising:

a microphone;

an analog front end section configured to receive an analog signal from the microphone that may contain a signature sound and to extract sound parameter information from the analog signal;

a digital classification section coupled to the analog front end section being configured to compare the sound parameter information to a sound parameter reference stored in memory coupled to the digital classification section to detect when the signature sound is received in the analog signal and to generate a trigger signal when a signature sound is detected; and a wireless link interface controlled by an application processor, wherein the wireless link interface is operable to send a portion of the extracted sound parameter information to a remote training location for adaptive training when a signature sound detection error occurs; and configured to receive an updated sound parameter reference from the remote training location in response to the adaptive training.

13. The apparatus of claim 12, wherein the wireless link interface is operable to periodically send a portion of the extracted sound parameter information to the remote training location for adaptive training without an occurrence of a detection error.

14. The apparatus of claim 12, wherein the wireless link interface is operable to periodically receive a request from the remote training location; and to send a portion of the extracted sound parameter information to the remote training location for adaptive training in response to the request from the remote training location.

15. The apparatus of claim 12, wherein the analog front end section is configured to extract sound parameter information from the analog signal at a sample rate of less than or equal to approximately 500 samples per second.

16. The apparatus of claim 13, wherein the sample rate is approximately 50 samples per second.

* * * * *